(12) United States Patent
Iwase et al.

(10) Patent No.: US 11,875,776 B2
(45) Date of Patent: Jan. 16, 2024

(54) RESPONSE GENERATING APPARATUS, RESPONSE GENERATING METHOD, AND RESPONSE GENERATING PROGRAM

(71) Applicant: Sony Group Corporation, Tokyo (JP)

(72) Inventors: Hiro Iwase, Tokyo (JP); Mari Saito, Tokyo (JP)

(73) Assignee: Sony Group Corporation, Tokyo (JP)

( * ) Notice: Subject to any disclaimer, the term of this patent is extended or adjusted under 35 U.S.C. 154(b) by 414 days.

(21) Appl. No.: 17/283,957

(22) PCT Filed: Oct. 9, 2019

(86) PCT No.: PCT/JP2019/039756
§ 371 (c)(1),
(2) Date: Apr. 9, 2021

(87) PCT Pub. No.: WO2020/105302
PCT Pub. Date: May 28, 2020

(65) Prior Publication Data
US 2021/0398517 A1   Dec. 23, 2021

(30) Foreign Application Priority Data
Nov. 22, 2018   (JP) .................................. 2018-219732

(51) Int. Cl.
*G10L 13/027* (2013.01)
*G10L 15/183* (2013.01)
*G10L 15/22* (2006.01)

(52) U.S. Cl.
CPC .......... *G10L 13/027* (2013.01); *G10L 15/183* (2013.01); *G10L 15/22* (2013.01); *G10L 2015/223* (2013.01)

(58) Field of Classification Search
CPC ..... G10L 13/027; G10L 15/183; G10L 15/22; G10L 2015/223
(Continued)

(56) References Cited

U.S. PATENT DOCUMENTS

| 11,038,934 B1 * | 6/2021 | Hansen | .................. H04L 43/08 |
| 2012/0030227 A1 * | 2/2012 | Mital | .................. G06F 16/9535 |
| | | | 707/767 |
| 2015/0039316 A1 | 2/2015 | Tzirkel-Hancock et al. | |

FOREIGN PATENT DOCUMENTS

| JP | 2000-181475 A | 6/2000 |
| JP | 2002-318962 A | 10/2002 |

(Continued)

OTHER PUBLICATIONS

L. Wang, X. Zhao, Y. Si, L. Cao and Y. Liu, "Context-Associative Hierarchical Memory Model for Human Activity Recognition and Prediction," in IEEE Transactions on Multimedia, vol. 19, No. 3, pp. 646-659, Mar. 2017, doi: 10.1109/TMM.2016.2617079. (Year: 2016).*

(Continued)

*Primary Examiner* — Bharatkumar S Shah
(74) *Attorney, Agent, or Firm* — XSENSUS LLP

(57) ABSTRACT

A response generating apparatus (10) includes an acquiring unit (40) that acquires input information that is a trigger for generating a response with respect to a user and context information that is information indicating a situation of the user and a response generating unit (50) that generates, based on the context information acquired from the user, a response associated with the input information.

16 Claims, 19 Drawing Sheets

(58) Field of Classification Search
USPC .......................................................... 704/260
See application file for complete search history.

(56) References Cited

FOREIGN PATENT DOCUMENTS

| JP | 2015-81971 A | 4/2015 |
|----|--------------|--------|
| JP | 2015-133047 A | 7/2015 |
| WO | 2016/136062 A1 | 9/2016 |

OTHER PUBLICATIONS

L. Wang, X. Zhao, Y. Si, L. Cao and Y. Liu, "Context-Associative Hierarchical Memory Model for Human Activity Recognition and Prediction," in IEEE Transactions on Multimedia, vol. 19, No. 3, pp. 646-659, Mar. 2017, doi: 10.1109/TMM.2016.2617079. (Year: 2016) (Year: 2016).*

C. Perera, A. Zaslavsky, P. Christen and D. Georgakopoulos, "Context Aware Computing for The Internet of Things: A Survey," in IEEE Communications Surveys & Tutorials, vol. 16, No. 1, pp. 414-454, First Quarter 2014, doi: 10.1109/SURV.2013.042313.00197 . (Year: 2014).*

International Search Report and Written Opinion dated Dec. 17, 2019, received for PCT Application PCT/JP2019/039756, Filed on Oct. 9, 2019, 14 pages including English Translation.

* cited by examiner

FIG.5

| USER ID | USER ATTRIBUTE INFORMATION | HISTORY INFORMATION | |
|---|---|---|---|
| ... | ... | ... | ... |
| U01 | F01 | G01 | ... |
| U02 | F02 | G02 | ... |
| ... | ... | ... | ... |

FIG.6

| KNOWLEDGE ID | TYPE | USER ID | CONTENT | |
|---|---|---|---|---|
| ... | ... | ... | ... | ... |
| J01 | SCHEDULE | U01 | SCHEDULE REGISTRATION (EVENT: DRINKING PARTY, PLACE: YOKOHAMA, DATE AND TIME: 2018/9/17/18:00, ...) | ... |
| J02 | COMMUTATION ROUTE | U01 | ROUTE SETTING (BOARDING STATION, TRANSFER STATION, ROUTE, ...) | ... |
| ... | ... | ... | ... | ... |

FIG.7

| INPUT INFORMATION | RESPONSE | SERVICE TO BE CONNECTED | CONTENT | ... |
|---|---|---|---|---|
| ... | ... | ... | ... | ... |
| DETECTION (MORNING) | GREETING | - | GOOD MORNING. | ... |
| DETECTION (POWER OFF) | END NOTIFICATION | - | WILL END. | ... |
| ACTION PREDICTION (GOING OUT) | WEATHER INFORMATION | L01,L02,... | TODAY'S WEATHER IS ... | ... |
| RECEPTION (NOTIFICATION) | VOICE | L03 | RECEIVED MAIL. ... | ... |
| ... | ... | ... | ... | ... |

FIG.8

| USER ID | TYPE OF CONTEXT INFORMATION TO BE GRANTED | ATTRIBUTE CONFORMANCE TAG | USER SITUATION TAG | HISTORY INFORMATION | ... |
|---|---|---|---|---|---|
| ... | ... | ... | ... | ... | ... |
| U01 | DATE OF TODAY | date appointment shedule | HOLIDAY ANNIVERSARY | CheckTime: THREE TIMES | ... |
| | CURRENT TIME | Time appointment shedule | GET UP GOING OUT VISUAL IMPAIRMENT | CheckWeather: ONE TIME SendPartyInvitation: ONE TIME | ... |
| | PEOPLE AROUND USER | readOut authentication | NOW COOKING VISUAL IMPAIRMENT | CheckMessage: TWO TIMES InputPassword: THREE TIMES | ... |
| | | ... | ... | ... | ... |
| | HOME APPLIANCE SITUATION | Place powerStatus | GOING OUT GO TO BED POWER ON | SetArarm: TWO TIMES | ... |
| | TRAFFIC SITUATION | Place time | GOING OUT DELAY | CheckWhether: ONE TIME | ... |
| | | ... | ... | ... | ... |
| | ONLINE STATUS OF FRIEND | Party Message | DURING GAME ONLINE | SendPartyInvitation: THREE TIMES SendMessage: ONE TIME | ... |
| | ... | ... | ... | ... | ... |
| ... | | | | | ... |

~34

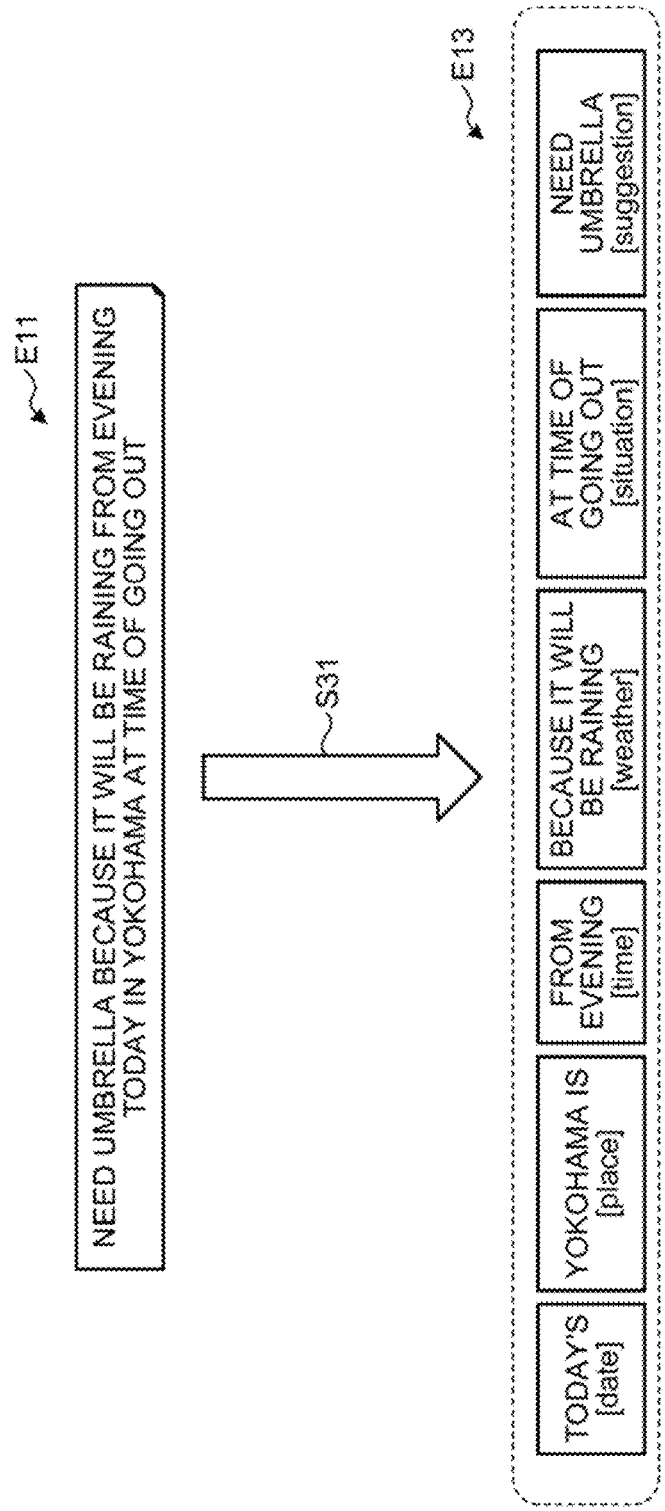

RESPONSE GENERATING APPARATUS, RESPONSE GENERATING METHOD, AND RESPONSE GENERATING PROGRAM

CROSS-REFERENCE TO RELATED APPLICATIONS

The present application is based on PCT filing PCT/JP2019/039756, filed Oct. 9, 2019, which claims priority to JP 2018-219732, filed Nov. 22, 2018, the entire contents of each are incorporated herein by reference.

FIELD

The present disclosure relates to a response generating apparatus, a response generating method, and a response generating program. More particularly, the present disclosure relates to a generating process of responses that are output with respect to users who use an information devices.

BACKGROUND

With the development of smartphones and smart speakers, a dialogue system for making appropriate responses with respect to a user in response to a speech accepted from the user, an action of the user, or the like is widely used.

For example, there is a proposed technology for implementing a natural dialogue between a user and an agent by using a context in line with a sentence in order to understand a meaning of a voice that has been input by the user.

CITATION LIST

Patent Literature

Patent Literature 1: Japanese Laid-open Patent Publication No. 2015-81971

SUMMARY

Technical Problem

According to the conventional technology described above, by using the context in order to understand a meaning of a speech of the user, it is possible to recognize an intent of the speech given by the user with accuracy.

However, in the conventional technology, it is not always possible to generate a flexible response conforming to the context of the user. Specifically, in the conventional technology, although it is possible to progress a natural dialogue by setting a task in line with the context, the response of the speech itself given by the agent is merely the content that is set in advance in each task. Namely, in the conventional technology, although it is possible to naturally progress a dialogue, in some cases, it is not possible to generate a flexible response, such as changing a response conforming to the situation faced by the user.

Thus, the present disclosure proposes a response generating apparatus, a response generating method, and a response generating program that can generate a flexible response conforming to the context of the user.

Solution to Problem

To solve the problem described above, a response generating apparatus includes: an acquiring unit that acquires input information that is a trigger for generating a response with respect to a user and context information that is information indicating a situation of the user; and a response generating unit that generates a response associated with the input information based on the context information acquired from the user.

BRIEF DESCRIPTION OF DRAWINGS

FIG. 5 is a diagram illustrating an example of a user information table according to the first embodiment of the present disclosure.

FIG. 6 is a diagram illustrating an example of a shared knowledge table according to the first embodiment of the present disclosure.

FIG. 7 is a diagram illustrating an example of a response rule table according to the first embodiment of the present disclosure.

FIG. 8 is a diagram illustrating an example of a grant rule table according to the first embodiment of the present disclosure.

FIG. 9 is a diagram (1) illustrating an example of a generating process according to the first embodiment of the present disclosure.

DESCRIPTION OF EMBODIMENTS

Figure 1:
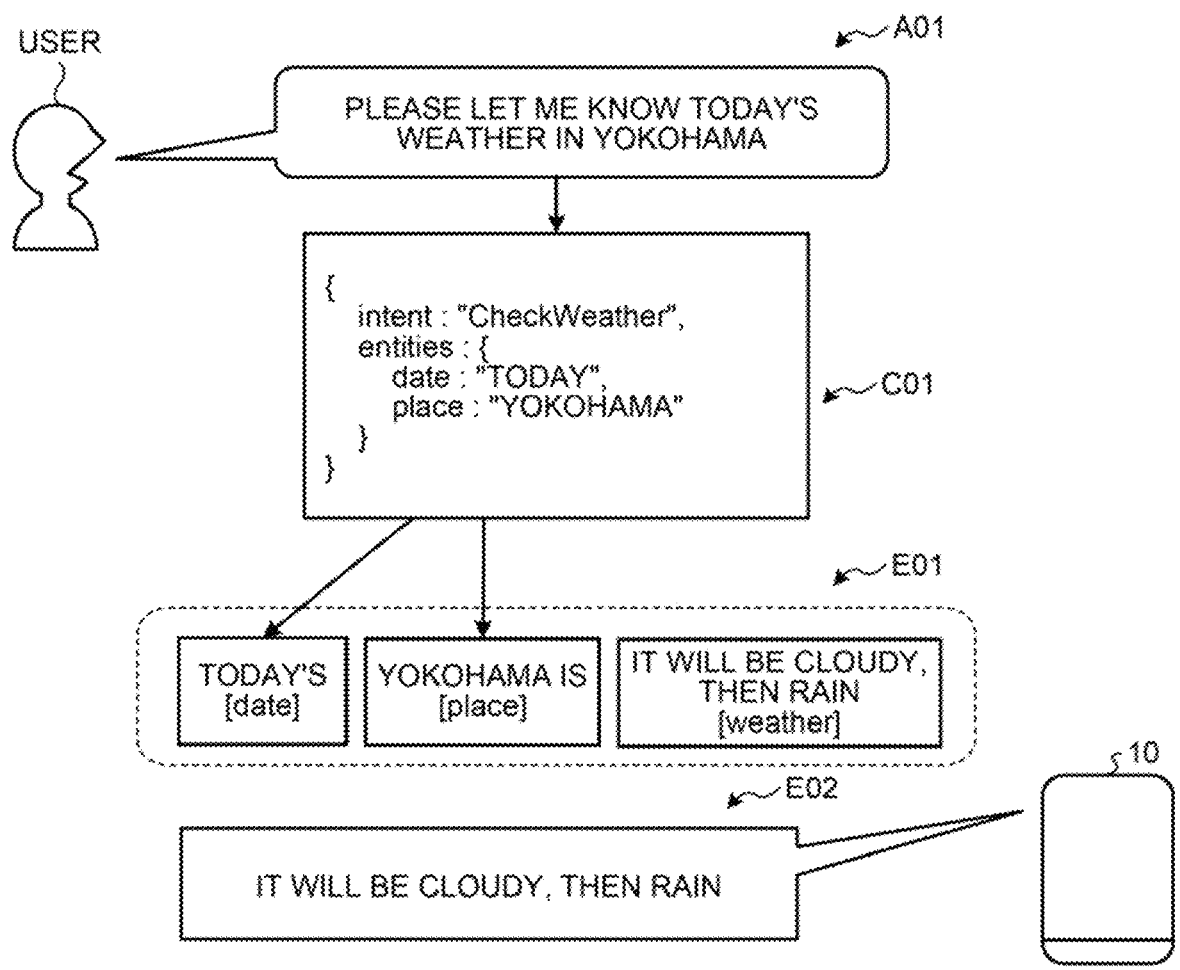
FIG. 1 is a diagram (1) illustrating an example of information processing according to a first embodiment of the present disclosure.

Preferred embodiments of the present disclosure will be explained in detail below with reference to the accompanying drawings. Furthermore, in each of the embodiments, components having the same functions are assigned the same reference numerals and descriptions of overlapped portions will be omitted.

The present disclosure will be explained in the following order of items.

1. First embodiment
1-1. Example of information processing according to the first embodiment
1-2. Outline of response generating process according to the first embodiment
1-3. Configuration of response generating system according to the first embodiment
1-4. Order of information processing according to the first embodiment
1-5. Modification according to the first embodiment
2. Second embodiment
2-1. Example of information processing according to the second embodiment
2-2. Modification according to the second embodiment
3. Other embodiment
4. Effects of response generating apparatus according to the present disclosure
5. Hardware configuration

1. First Embodiment

1-1. Example of Information Processing According to the First Embodiment

An example of information processing according to the first embodiment of the present disclosure will be described with reference to FIG. 1. FIG. 1 is a diagram (1) illustrating an example of the information processing according to the first embodiment of the present disclosure. The information processing according to the first embodiment of the present disclosure is performed by a response generating apparatus 10 illustrated in FIG. 1.

The response generating apparatus 10 is an example of a response generating apparatus according to the present disclosure. The response generating apparatus 10 is the so-called Internet of Things (IoT) apparatus and performs various kinds of information processing in cooperation with an external device, such as a cloud server. For example, the response generating apparatus 10 is an apparatus that conducts a dialogue with a user and that performs various kinds of information processing, such as voice recognition and responses. The processes of voice recognition, responses performed by voices, and the like performed by the response generating apparatus 10 are sometimes called an agent (Agent) function. Furthermore, the response generating apparatus 10 is sometimes called an agent device.

In the first embodiment, a description will be given of an example in which the response generating apparatus 10 is the so-called smart speaker (smart speaker). Furthermore, the response generating apparatus 10 may also include not only a speaker unit that performs a voice output but also include a display unit (a liquid crystal display, etc.) that outputs a video image or the like. Furthermore, the response generating apparatus 10 may also be a smartphone, a tablet terminal, or the like. In this case, the smartphone or the tablet terminal functions as the response generating apparatus 10 according to the present disclosure by executing programs (applications) for implementing a response generating process according to the present disclosure.

Furthermore, in addition to the smartphone or the tablet terminal, the response generating apparatus 10 may also be a wearable device, such as a clock type terminal or an eye-glasses type terminal. Furthermore, the response generating apparatus 10 may also be implemented by various smart devices having an information processing function. For example, the response generating apparatus 10 may also be a smart household appliance, such as a television, an air conditioner, or a refrigerator; a smart vehicle, such as an automobile; or a home purpose robot; or the like.

In the example illustrated in FIG. 1, it is assumed that the response generating apparatus 10 is set up in a user's home where the user who uses the response generating apparatus 10 lives. In the first embodiment, the response generating apparatus 10 performs a response process with respect to information (hereinafter, referred to as "input information") that is a trigger for generating a response and that is obtained by collecting voices, actions of the user, and the like. For example, the response generating apparatus 10 recognizes a question asked by the user and then performs a voice output of the reply with respect to the question or displays information related to the question on a screen. Furthermore, various known technologies may also be used for the voice recognition process, the output process, and the like performed by the response generating apparatus 10.

Incidentally, the response output by the agent device tends to be redundant compared with conversation held between humans. For example, in some cases, the response output from the agent device includes the content, such as the content of the question asked by the user or the situation around the user, that is obvious for the user. In this case, the user reduces his awareness of listening to the response and may possibly decrease in awareness of continuing to have the conversation. On the other hand, if the agent device generates a response by omitting a response or by using a deictic word without taking into account the situation faced by the user, there may possibly be a case in which the user does not uniquely understand the content of the speech.

Namely, there is a problem in that a dialogue process performed by the agent device needs to flexibly generate a response having the content that is not redundant and that is easy to understand for a user.

Thus, the response generating apparatus 10 according to the present disclosure solves the problem described above by acquiring information related to the context of a dialogue, the situation faced by the user, or the like (hereinafter, referred to as "context information") and by generating a response by using the acquired context information. For example, the response generating apparatus 10 generates a response that is actually output after having deleted elements (words and phrases, etc.) that are estimated to be obvious for the user based on the context information and that is included in a temporary response generated as a reply to the input information obtained by a voice or the like. Alternatively, the response generating apparatus 10 generates a response that is actually output by replacing the element that is included in the temporary response and that is estimated to be obvious for the user with information (a demonstrative pronoun, etc.) having a high abstraction level.

Furthermore, the response generating apparatus 10 may also generate a response that is actually output by adding the element that is estimated not to be obvious for the user based on the context information to the temporary response.

In this way, the response generating apparatus 10 performs the process, based on the context information, of deleting, replacing, and adding the information from the temporary response that has been generated in association with the input information, and then, generates a response with respect to the user. Accordingly, because the response generating apparatus 10 can generate a flexible response conforming to the context of the user, it is possible to improve the usability of the user who uses the agent function, such as the dialogue system.

In the following, an example of the information processing (response generating process) according to the present disclosure will be described with reference to FIG. 1.

As illustrated in FIG. 1, the user inputs, by giving a speech of "please let me know the weather today in Yokohama", a voice A01 including the content of "please let me know the weather today in Yokohama" to the response generating apparatus 10.

The response generating apparatus 10 starts the response generating process based on the voice A01 as the input information. Specifically, the response generating apparatus 10 acquires the voice A01 and generates a response associated with the voice A01 after performing an automatic speech recognition (ASR) process or a natural language understanding (NLU) process. For example, if an intent of a question from the user is included in the voice A01, the response generating apparatus 10 recognizes that the intent of the question is the input information and generates a reply with respect to the intent of the question as the response.

Information C01 illustrated in FIG. 1 indicates the intent (intent) of the question obtained by analyzing the voice A01 and the context information included in the voice A01. Specifically, the information C01 includes a tag, such as "CheckWhether", indicating the intent of the user to "wish to check the weather", and also includes "today (attribute: date)" and "Yokohama (attribute: place)" that are the combination of each of the words included in the speech and the attribute (entity) and that are the context information.

Furthermore, the response generating apparatus 10 may also acquire the context information indicating the current situation of the user together with the voice A01. Although will be described later in detail, the response generating apparatus 10 estimates the situation of the user by, for example, detecting a moving speed of the user, the place in which the user is located, a speaking speed of the user captured by the camera, and the like, and acquires the estimated data as the context information. Namely, the context information may also include the situation faced by the user, an estimated feeling of the user, or the like. For example, if the context information indicating the situation in which the user is in a hurry rather than usual, the response generating apparatus 10 can perform adjustment of, for example, generating a shorter response. In the example illustrated in FIG. 1, because the user does not take a particular action, such as the user being in a rush to receive a reply or being about to go out, it is assumed that the context information indicating the situation of the user is a "normal dialogue process".

The response generating apparatus 10 acquires the information C01 that includes the input information and the context information that indicates the situation of the user, and generates a response with respect to the user based on the acquired information.

First, the response generating apparatus 10 generates, based on the input information, a temporary response that is the original of the response that is to be actually output. Furthermore, in a description below, the temporary response generated by the response generating apparatus 10 based on the input information is referred to as "speech source information". The response generating apparatus 10 generates, based on the generated speech source information, a response that is to be actually output to the user.

As described above, after having performed the ASR and the NLU processes, the response generating apparatus 10 determines that the intent of the voice A01 is "a wish to check the weather (intent: CheckWeather)". In this case, the response generating apparatus 10 generates speech source information E01 as the temporary response with respect to the voice A01.

As illustrated in FIG. 1, the speech source information E01 includes the element in which the speech data of "today's" is associated with "[date]" that is the attribute of "today's". Furthermore, the speech source information E01 includes the element in which "Yokohama is" is associated with the attribute of [place] and the element in which "It will be cloudy, then rain" is associated with the attribute of [weather].

The response generating apparatus 10 that has generated the speech source information E01 decides, based on the context information included in the information C01, the information to be deleted from the speech source information E01. For example, the response generating apparatus 10 deletes the information that is obvious for the user included in the speech source information E01. Specifically, the response generating apparatus 10 deletes, from the speech source information E01, the attribute that is included in the voice A01 given by the speech of the user, i.e., the information related to the attribute that overlaps with the context information.

In the example illustrated in FIG. 1, the response generating apparatus 10 compares the speech source information E01 with the information C01 and determines that the element having the [date] attribute and the element having the [place] attribute overlap in both of the speech source information E01 and the information C01. In this case, the response generating apparatus 10 deletes, from the speech source information E01, the element ("today") having the [date] attribute and the element ("Yokohama is") having the [place] attribute.

In this way, the response generating apparatus 10 generates, from the speech source information E01, a response E02 corresponding to a response that is actually output to the user. As illustrated in FIG. 1, the response E02 is a voice having only the [weather] attribute represented by, for example, "It will be cloudy, then rain".

Accordingly, the response generating apparatus 10 can clearly output only the information that expresses, for example, "It will be cloudy, then rain" and that is desired to know by the user instead of giving a redundant response including information that expresses, for example, "It will be cloudy, then rain in Yokohama today" and that is obvious for the user.

Figure 2:
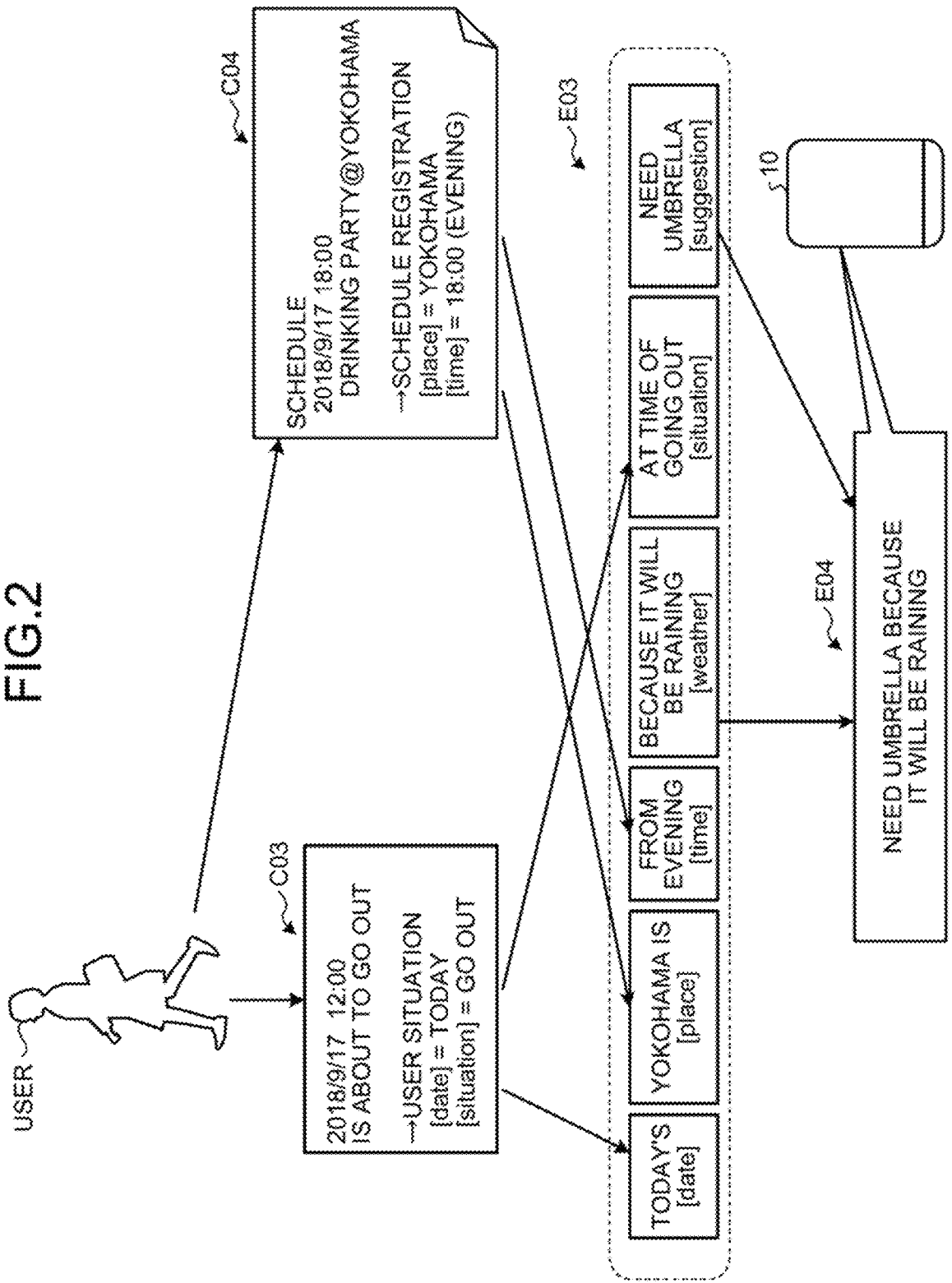
FIG. 2 is a diagram (2) illustrating an example of the information processing according to the first embodiment of the present disclosure.

In the following, an example in which the response generating apparatus 10 generates a response by using the context information that is previously registered by the user will be described with reference to FIG. 2. FIG. 2 is a diagram (2) illustrating an example of the information processing according to the first embodiment of the present disclosure.

In the example illustrated in FIG. 2, it is assumed that a setting has been performed such that, when the response generating apparatus 10 detects an action performed by the user who is about to go out, the response generating apparatus 10 makes a response indicating weather information on the visiting destination. In this case, the response generating apparatus 10 observes the action of the user by using a camera or the like and autonomously outputs the information related to the weather in a case of detecting that the user moves to the front door in the user's home.

For example, the response generating apparatus 10 acquires information C03 based on the detected situation of the user. The information C03 includes an action prediction indicating that "the user is about to go out". In the example illustrated in FIG. 2, the action prediction is the input information that is a trigger for the response generating apparatus 10 generating a response.

Furthermore, based on the situation in which the user is about to go out, the information C03 includes the context information indicating this situation. The context information included in the information C03 is, for example, "today (attribute: date)" indicating that the date in which the user is going to go out is today or the content of the action of the user is "go out (attribute: situation)".

Furthermore, in the example illustrated in FIG. 2, it is assumed that the user has registered the schedule into a specific service, such as a schedule management service. The schedule is shared between the specific service and the response generating apparatus 10.

Specifically, as indicated by information C04, the user registers the schedule having the content indicating a plan to participate a "drinking party" in "Yokohama" starting from "18:00 on Sep. 17, 2018". In this case, the response generating apparatus 10 acquires the information indicating "Yokohama (attribute: place)" and "18:00 (evening) (attribute: time)" as the context information of the subject user.

The response generating apparatus 10 generates speech source information E03 based on the acquired information C03 and the information C04. Specifically, when the response generating apparatus 10 detects a state in which "the user is going out", the response generating apparatus 10 acquires the weather information associated with the visiting destination of the user because the setting has been made so as to check the weather and output the obtained result. For example, the response generating apparatus 10 connects an external service that provides weather information and acquires weather prediction information, such as a weather forecast, or a suggestion (better to bring an umbrella, if it is rain, etc.) associated with the weather prediction.

In this case, the response generating apparatus 10 refers to the information C04, specifies the place (attribute: place) or time (attribute: time) conforming to the action of the user and acquires the weather information on the specified region or time.

Furthermore, the response generating apparatus 10 refers to the information C03 acquired when the user is about to go out, and then, acquires information indicating the date of the weather information or indicating which timing is appropriate for performing the action suggested from the weather service.

The response generating apparatus 10 generates the speech source information E03 based on the information described above. The speech source information E03 includes the respective elements in which "today's" is associated with the attribute [date], "Yokohama is" is associated with the attribute [place], "from evening" is associated with the attribute [time], "because it will be raining" is associated with the attribute [weather], "at the time of going out" is associated with the attribute [situation], and "need an umbrella" is associated with the attribute [suggestion].

Subsequently, the response generating apparatus 10 that has generated the speech source information E03 decides the information to be deleted from the speech source information E03 based on the context information included in the information C03 and the information C04. For example, the response generating apparatus 10 deletes the information that is obvious for the user included in the speech source information E03. Specifically, the response generating apparatus 10 deletes, from the speech source information E03, the information related to the attribute included in the context information in the information C03 and the information C04, i.e., the attribute that overlaps with the context information.

In the example illustrated in FIG. 2, the response generating apparatus 10 compares the speech source information E03 with the information C03 and determines that the element having the [date] attribute and the element having the [situation] attribute overlap with the speech source information E03 and the information C03. In this case, the response generating apparatus 10 deletes the element ("today's") having the [date] attribute and the element ("at the time of going out") having the [situation] attribute from the speech source information E03.

Furthermore, the response generating apparatus 10 compares the speech source information E03 with the information C04 and determines that the element having the [place] attribute and the element having the [time] attribute overlap with the speech source information E03 and the information C04. In this case, the response generating apparatus 10 deletes the element ("Yokohama is") having the [place] attribute and the element ("from evening") having the [time] attribute from the speech source information E03.

In this way, the response generating apparatus 10 generates, from the speech source information E03, the response E04 corresponding to the response that is actually output to the user. As illustrated in FIG. 2, the response E04 is a voice having only the [weather] attribute and the [suggestion] attribute "need an umbrella because it will be raining".

Accordingly, the response generating apparatus 10 can generate the short and accurate response E04 in which information, such as the situation of the user and the information registered in the schedule by the user, that is obvious for the user is omitted.

In this way, the response generating apparatus 10 according to the first embodiment acquires the input information that is a trigger for generating a response with respect to the user and also acquires the context information that is the information indicating the situation of the subject user. Then, the response generating apparatus 10 generates a response associated with the input information based on the context information acquired from the user.

Namely, by deleting the obvious information estimated from the context information, the response generating apparatus 10 can simply generate an appropriate response in accordance with the situation at that time. Consequently, the user can only listen to necessary and sufficient information without decreasing in awareness with respect to the speech given by the agent; therefore, the user can easily understand the gist of the response given by the agent. In particular, in a case in which the speech indicated by the example illustrated in FIG. 2 is autonomously started on the agent side, in a state in which attention (awareness) of the user is low, a concise speech is effective in terms of gaining attention of the user and delivering the gist of the information. With the response generating apparatus 10, because it is possible to generate a response by accurately selecting only the information that is estimated to be desired by the user, it is possible to more effectively provide the agent function of, for example, dialogues to the user.

Furthermore, although details will be described later, the response generating apparatus 10 can generate not only a response by deleting the obvious information from the speech source information but also a response by replacing specific information or by adding information that is not obvious for the user. In this way, the response generating apparatus 10 can flexibly generate a response conforming to the situation of the user by using the context information.

Figure 3:
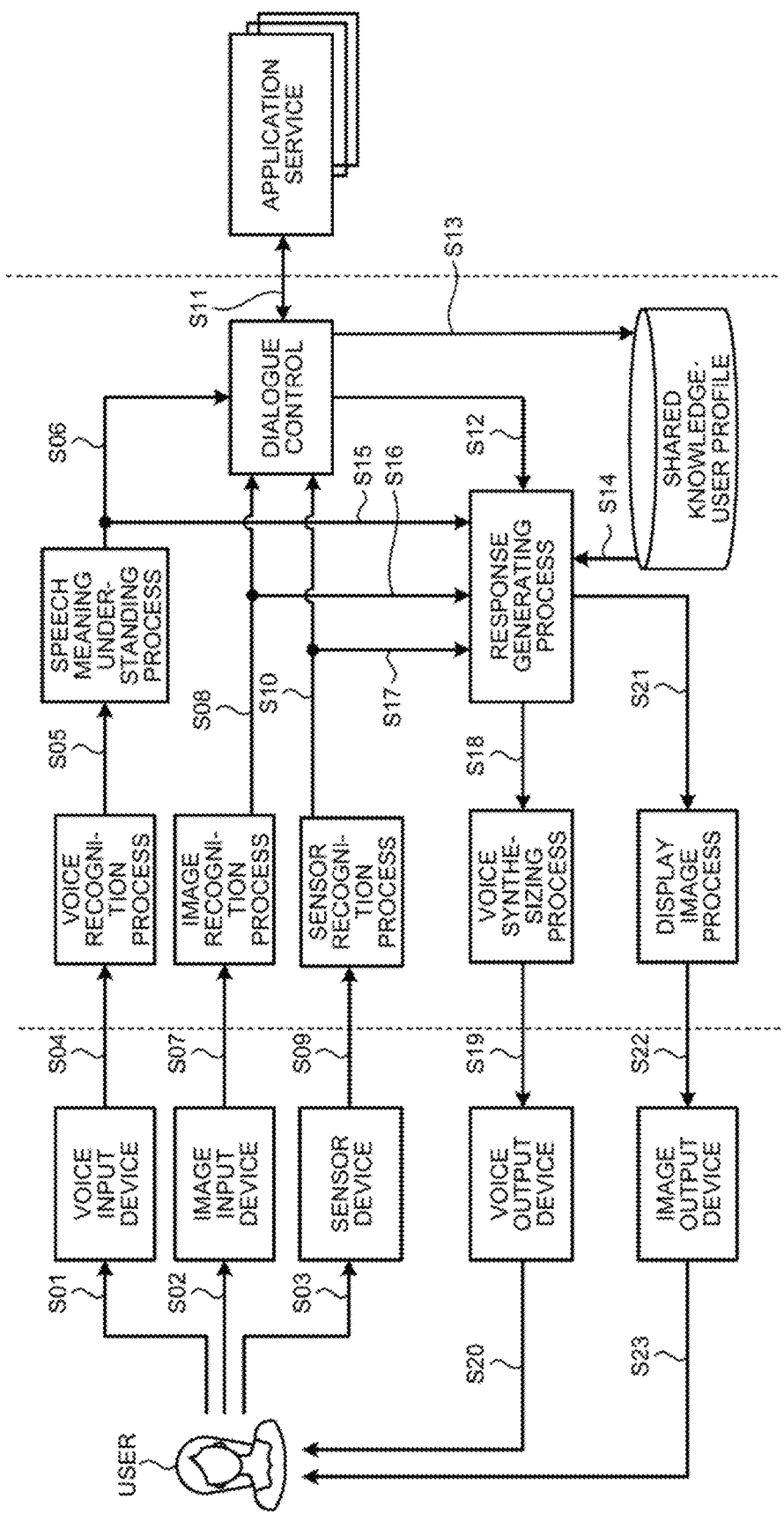
FIG. 3 is a diagram illustrating a response generating process according to the first embodiment of the present disclosure.

1-2. Outline of Response Generating Process According to the First Embodiment In the following, the outline of the response generating process according to the first embodiment of the present disclosure will be described with reference to FIG. 3. FIG. 3 is a diagram illustrating the response generating process according to the first embodiment of the present disclosure.

When the user gives a speech, the response generating apparatus 10 acquires a voice via a voice input device (Step S01). Furthermore, the response generating apparatus 10 may also acquire an action or the like of the user as an image or a moving image via an input device, such as a camera (Step S02). Furthermore, the response generating apparatus 10 may also acquire, via a tactile device or a sensor device, such as an acceleration sensor or a gyro sensor, information indicating that the response generating apparatus 10 is touched by a user or a movement is made by the response generating apparatus 10 (Step S03).

When the response generating apparatus 10 acquires the voice, the response generating apparatus 10 performs a voice recognition process (Step S04). For example, the response generating apparatus 10 converts the acquired voice to a text. Furthermore, the response generating apparatus 10 performs a speech meaning understanding process (NLU) on the voice that has been subjected to text conversion, and then, estimates a speech intent and an attribute information (Entity) that is targeted for the speech intent (Step S05). Subsequently, the response generating apparatus 10 sends the estimated information to a dialogue control process (Step S06).

Furthermore, when the response generating apparatus 10 acquires an image, the response generating apparatus 10 performs an image recognition process (Step S07) and sends the information obtained by image recognition to a dialogue control process (Step S08). Furthermore, when the response generating apparatus 10 acquires sensing information other than the voice or the image, the response generating apparatus 10 performs a sensor recognition process (Step S09), and sends the information obtained by the sensor recognition to the dialogue control process (Step S10).

The response generating apparatus 10 acquires, as the dialogue control process, based on the speech intent obtained from the NLU and the context information indicating the user situation, the information that is the original of the response with respect to the user from various applications and the service provided by an external server (Step S11). The response generating apparatus 10 starts the response generating process based on the acquired information (Step S12).

Furthermore, the response generating apparatus 10 accesses a storage unit that stores therein shared knowledge, such as schedule registered by the user, a user profile (attribute information on the user, etc.) (Step S13), and acquires information that is used for the response generating process (Step S14).

Furthermore, the response generating apparatus 10 acquires the context information obtained when the voice, the image, the sensing information, or the like is acquired (Step S15, Step S16, and Step S17). The response generating apparatus 10 generates speech source information by using the information acquired from the application or the service, the shared knowledge, the user profile, and the context information. Furthermore, the response generating apparatus 10 performs a process of deleting information that is obvious for the user from the speech source information and generates a response that is actually output to the user.

If the generated response is data related to a voice, the response generating apparatus 10 performs a voice synthesizing process (Step S18), and outputs a voice to the user (Step S20) via a voice output device, such as a speaker (Step S19).

Furthermore, if the generated response is data related to the image, the response generating apparatus 10 performs a display image process (Step S21), and outputs the image to the user (Step S23) via an image output device, such as a display (Step S22).

Furthermore, in FIG. 3, the outline of the response process related to the first embodiment is illustrated as a processing block diagram; however, the diagram conceptually indicates the flow of the process and the processes do not always need to be performed in the order exemplified in FIG. 3. For example, configuration is possible such that the response generating process may also be included in dialogue control or may also be an internal process in an application or a service.

Figure 4:
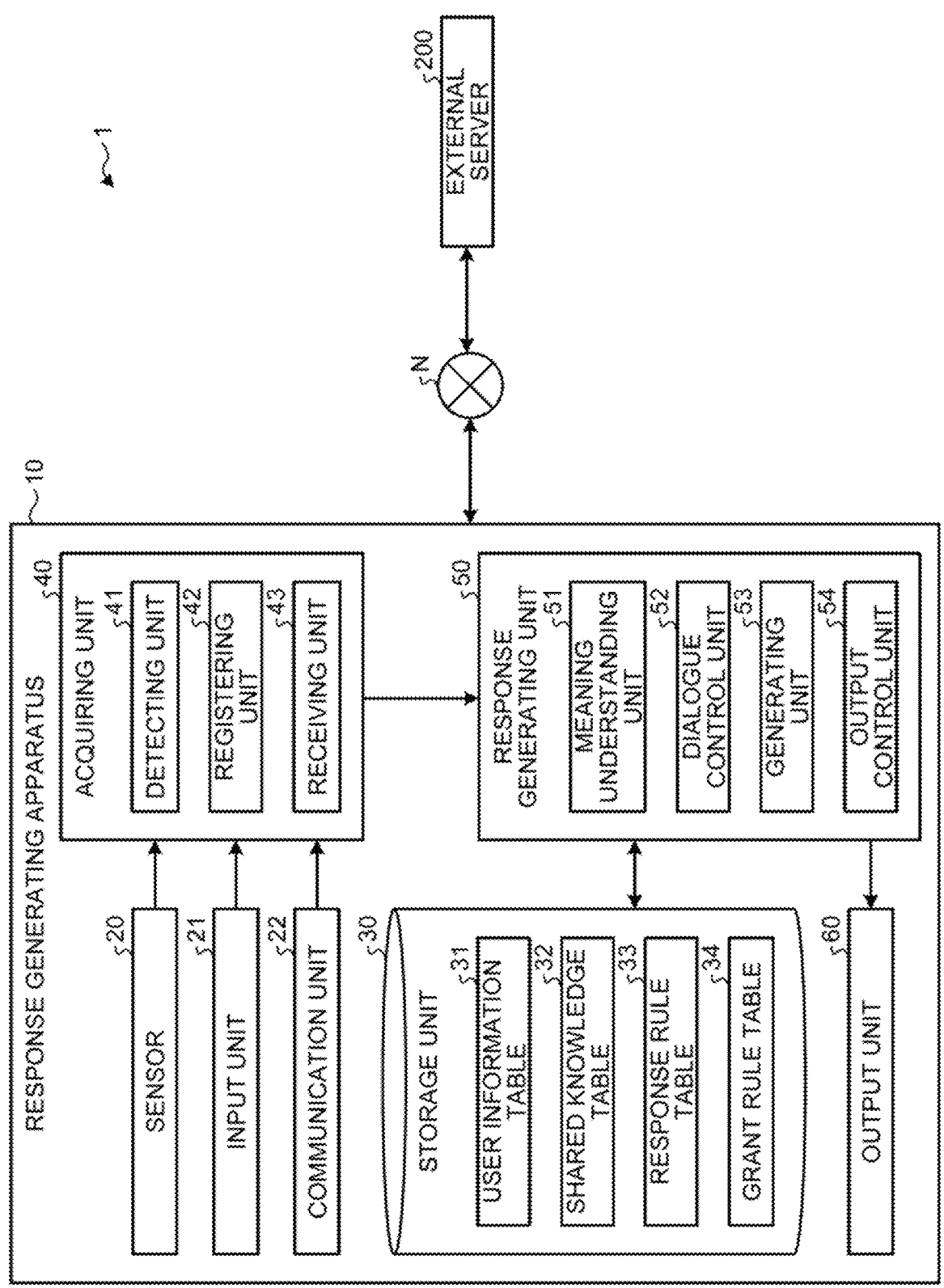
FIG. 4 is a block diagram illustrating a configuration example of a response generating system according to the first embodiment of the present disclosure.

1-3. Configuration of Response Generating System According to the First Embodiment In the following, configuration of a response generating system 1 including the response generating apparatus 10 will be described. FIG. 4 is a diagram illustrating a configuration example of the response generating system 1 according to the first embodiment of the present disclosure.

As illustrated in FIG. 4, the response generating system 1 includes the response generating apparatus 10 and an external server 200. The response generating apparatus 10 and the external server 200 are connected via a network N (for example, the Internet) illustrated in FIG. 4, in a wired or wireless manner so as to be capable of communicating with each other. Furthermore, although not illustrated in FIG. 4, the response generating system 1 may also include a plurality of the response generating apparatuses 10 or the external servers 200.

The external server 200 is a service server that provides various services. For example, the external server 200 provides weather information, traffic information, or the like to the response generating apparatus 10 in accordance with a request made by the response generating apparatus 10.

The response generating apparatus 10 is an information processing terminal that performs the response generating process according to the present disclosure. As illustrated in FIG. 4, the response generating apparatus 10 includes a sensor 20, an input unit 21, a communication unit 22, a storage unit 30, an acquiring unit 40, a response generating unit 50, and an output unit 60.

The sensor 20 detects various kinds of information. For example, the sensor 20 includes a microphone that collects voices of a speech given by the user and a camera that acquires an action of the user as a video image.

Furthermore, the sensor 20 may also include a touch sensor that detects a touch of the response generating apparatus 10 performed by the user or an acceleration sensor, a gyro sensor, or the like.

Furthermore, the sensor 20 may also include a sensor that detects the current location of the response generating apparatus 10. For example the sensor 20 may also receive a radio wave output from a Global Positioning System (GPS) satellite and detect location information (for example, the latitude and the longitude) indicating the current location of the response generating apparatus 10 based on the received radio wave.

Furthermore, the sensor 20 may also include a radio wave sensor that detects radio waves emitted by an external device, an electromagnetic wave sensor that detects electromagnetic waves, or the like. Furthermore, the sensor 20 may also detect the environment given to the response generating apparatus 10. Specifically, the sensor 20 may also include an illuminance sensor that detects illuminance around the response generating apparatus 10, a humidity sensor that detects humidity around the response generating apparatus 10, a magnetic field sensor that detects magnetic fields in the location of the response generating apparatus 10, or the like.

The input unit 21 is a device for accepting various operations from the user. For example, the input unit 21 is implemented by a keyboard, a mouse, a touch panel, or the like.

The communication unit 22 is implemented by, for example, a network interface card (NIC), or the like. The communication unit 22 is connected to the network N in a wired or wireless manner and sends and receives information to and from the external server 200 or the like via the network N.

The storage unit 30 is implemented by, for example, a semiconductor memory device, such as a random access memory (RAM) and a flash memory, or a storage device, such as a hard disk and an optical disk. The storage unit 30 includes a user information table 31, a shared knowledge table 32, a response rule table 33, and a grant rule table 34. In the following, each of the data tables will be described in order.

The user information table 31 stores therein information related to the user who uses the response generating apparatus 10. FIG. 5 illustrates an example of the user information table 31 according to the first embodiment. FIG. 5 is a diagram illustrating an example of the user information table 31 according to the first embodiment of the present disclosure. In the example illustrated in FIG. 5, the user information table 31 has items, such as "user ID", "user attribute information", "history information", and the like.

The "user ID" indicates identification information for identifying a user. The "user attribute information" indicates various kinds of information on the user registered by the user at the time of using the response generating apparatus 10. In the example illustrated in FIG. 5, the item of the user attribute information is conceptually illustrated as "F01"; however, in practice, in the user attribute information, attribute information (user profile), such as an age or a gender, a dwelling place, and a family structure of a user, are included. Furthermore, in the user attribute information, information needed to select a type of information to be output, for example, information indicating that a user has a visual impairment may also be included. For example, if information indicating the visual impairment has been registered in the user attribute information, the response generating apparatus 10 may also convert the content of the response that is displayed on the screen in ordinary circumstances to a voice and output the voice.

The "history information" indicates a usage history of the response generating apparatus 10 used by the user. In the example illustrated in FIG. 5, the item of the history information is conceptually illustrated as "G01"; however, in practice, in the history information, various kinds of information, such as the content of question asked by the user to the response generating apparatus 10, a history of asking again, and a history of an output response, are included. Furthermore, in the history information, voice print information or waveform information for identifying the user by the voice may also be included.

Namely, in the example illustrated in FIG. 5, the user identified by the user ID of "U01" indicates that the user attribute information is "F01" and the history information is "G01".

In the following, the shared knowledge table 32 will be described. The shared knowledge table 32 stores therein information that is registered in the application used by the user or in the service provided from the external server 200 and that is shared by both of the application or the service and the response generating apparatus 10.

FIG. 6 illustrates an example of the shared knowledge table 32 according to the first embodiment. FIG. 6 is a diagram illustrating an example of the shared knowledge table 32 according to the first embodiment of the present disclosure. In the example illustrated in FIG. 6, the shared knowledge table 32 has items, such as "knowledge ID", "type", "user ID", "content", and the like.

The "knowledge ID" indicates identification information for identifying shared knowledge. The "type" indicates the type of the shared knowledge. Furthermore, the type may also be the name of the application or the service in which information is registered by the user.

The "user ID" indicates identification information for identifying the identification information who registers information. The "content" indicates specific content of the shared knowledge registered in the service or the like by the user.

Namely, in the example illustrated in FIG. 6, the shared knowledge identified by the knowledge ID of "J01" indicates that the type is "schedule", the user who registered the shared knowledge is the user identified by the user ID of "U01", and the content thereof is "schedule registration (event: drinking party, place: Yokohama, date and time: 2018/9/17/18:00, . . . )".

In the following, the response rule table 33 will be described. The response rule table 33 stores therein, in an associated manner, the input information with respect to the response generating apparatus 10 and the content output by the response generating apparatus 10 when the input information is detected.

FIG. 7 illustrates an example of the response rule table 33 according to the first embodiment. FIG. 7 is a diagram illustrating an example of the response rule table 33 according to the first embodiment of the present disclosure. In the example illustrated in FIG. 7, the response rule table 33 has items, such as "input information", "response", "service to be connected", "content", and the like.

The "input information" indicates information that is a trigger for the response generating apparatus 10 generating a response. The "response" indicates the type of the response generated by the response generating apparatus 10 at the time of acquiring the input information.

For example, the input information "detection (morning)" indicates that the response generating apparatus 10 detects the user via a camera or the like for the first time in the morning time zone. Furthermore, a response "greeting" indicates that the response generating apparatus 10 generates an output related to the greeting. According to this response rule, in a case in which, for example, the user wakes up and is detected by the response generating apparatus 10 for the first time on that day, the response generating apparatus 10 autonomously gives a greeting to the user.

The "service to be connected" indicates the name of the external service, the application, or the like connected by the response generating apparatus 10 in order to generate a response. Furthermore, if the response generating apparatus 10 does not need to connect the external service in order to generate a response, the item of the "service to be connected" is blank. Furthermore, in the example illustrated in FIG. 7, the item of the service to be connected is conceptually illustrated as "L01"; however, in practice, in the service to be connected, a specific name of the service that provides the weather information, the traffic information, and the like, or a connection destination of the service (specific address, etc.) are stored.

The "content" indicates the specific content of the response generated by the response generating apparatus 10. For example, the content is the specific content of a speech of a greeting, or the like.

Namely, the example illustrated in FIG. 7 indicates that, when the input information "detection (morning)" is input, the response generating apparatus 10 is set to perform "greeting" as a response and the output content thereof is a phrase of "good morning". Furthermore, as another example, the example indicates that, when the input information "detection (turn off a power supply)" is input, i.e., when the power supply of the response generating apparatus 10 is turned off, the response generating apparatus 10 is set to perform "shut down notification" as a response and the output content thereof is "will shut down". Furthermore, as another example, the example indicates that, when the input information "action prediction (going out)" is input, i.e., when the response generating apparatus 10 predicts that the user is about to go out, the response generating apparatus 10 is set to perform "weather information" as a response, connect the service "L01", "L02", or the like, and send a notification indicating that, for example, "today's weather in Tokyo is . . . ". Furthermore, as another example, the example indicates that, when the input information "reception (notification)" is input, i.e., when the response generating apparatus 10 receives a mail or the like, the response generating apparatus 10 is set to send a notification by "voice" as a response, connect the service "L03" or the like (mail server, etc.), and send a notification indicating that, for example, "has received a mail . . . ".

Furthermore, the response rule described above may also be previously set in the response generating apparatus 10 or may also be arbitrarily set by the user.

In the following, the grant rule table 34 will be described. The grant rule table 34 stores therein the rule related to a grant in a case in which the response generating apparatus 10 generates a response after granting information to a temporary response with respect to speech source information.

FIG. 8 illustrates an example of the grant rule table 34 according to the first embodiment. FIG. 8 is a diagram illustrating an example of the grant rule table 34 according to the first embodiment of the present disclosure. In the example illustrated in FIG. 8, the grant rule table 34 has items, such as "user ID", "type of context information to be granted", "attribute conformance tag", "user situation tag", "history information", and the like.

The "user ID" indicates the identification information on the user targeted for granting information. The "type of context information to be granted" indicates the type of context information granted to the speech source information.

The "attribute conformance tag" indicates the attribute associated with the element included in the information that is used when the response generating apparatus 10 decides the context information to be granted and that is the speech source information. Although will be described later in detail, the response generating apparatus 10 decides information to be granted from among the pieces of speech source information in accordance with the number of elements having the attributes included in the "attribute conformance tag".

The "user situation tag" is information indicating the situation of the user targeted for generating a response. Although will be described later in detail, the response generating apparatus 10 decides, in the situation of generating a response with respect to the user, the information to be granted in accordance with the number of times the user conforms to the elements included in the "user situation tag".

The "history information" indicates the history having the content of the speech given by the user in the past in the situation in which the context information is about to be granted. Specifically, the history information indicates, in the situation in which the context information has been granted, the type of intent of the speech given by the user in the past and the number of times of the speeches performed. Although will be described later in detail, the response generating apparatus 10 decides, in the situation of generating a response with respect to the user, the information to be granted in accordance with the number of times the user gave the speeches included in the "history information" in the past.

Namely, in the example illustrated in FIG. 8, from among the responses generated with respect to the user identified by the user ID "U01", one of the determination criteria for granting the type of the context information "date of today" indicates that, for example, how many attribute conformance tags of "date", "appointment", and "schedule" are included in the speech source information. Furthermore, another one of the determination criteria for granting the type of the context information "date of today" indicates that, for example, the number of times the situation of the user identified by the user ID "U01" corresponds to the user situation tags of "holiday" and "anniversary". Furthermore, the example illustrated in FIG. 8 indicates that, in a dialogue performed when the type of the context information "date of today" is granted, the user identified by the user ID "U01" gave the speech indicating the intent of "CheckTime" three times in the past.

A description will be continued by referring back to FIG. 4. Each of the acquiring unit 40 and the response generating unit 50 is a processing unit that performs information processing performed by the response generating apparatus 10. Each of the acquiring unit 40 and the response generating unit 50 is implemented by, for example, a central processing unit (CPU), a micro processing unit (MPU), a graphics processing unit (GPU), or the like executing, in a random access memory (RAM) or the like as a work area, the program (for example, a response generating program according to the present disclosure) that is stored in the response generating apparatus 10. Furthermore, each of the acquiring unit 40 and the response generating unit 50 is a controller and may also be implemented by, for example, an integrated circuit, such as an application specific integrated circuit (ASIC), a field programmable gate array (FPGA), or the like.

The acquiring unit 40 is a processing unit that acquires various kinds of information. As illustrated in FIG. 4, the acquiring unit 40 includes a detecting unit 41, a registering unit 42, and a receiving unit 43.

The detecting unit 41 detects, via a microphone that is an example of the sensor 20, various kinds of information via the sensor 20. For example, the detecting unit 41 detects a voice of a speech given by the user. Furthermore, the detecting unit 41 may also detect, via a camera, an acceleration sensor, an infrared sensor, or the like, face information on the user or various kinds of information related to an action, such as orientation of the user's body, an inclination, a movement, or a moving speed, that is performed by the user. Namely, the detecting unit 41 may also detect, via the sensor 20, various kinds of physical amount, such as location information, acceleration, a temperature, gravity, rotation (angular velocity), illuminance, a magnetic field, a pressure, proximity, humidity, or a rotation vector, as context information.

The registering unit 42 accepts registration from the user via the input unit 21. For example, the registering unit 42 accepts registration of a user profile (attribute information) from the user via a touch panel or a keyboard.

Furthermore, the registering unit 42 may also accept registration of schedule or the like of the user. For example, the registering unit 42 accepts registration of schedule from the user by using an application function installed in the response generating apparatus 10.

The receiving unit 43 receives various kinds of information. For example, if attribute information or schedule information related to the user is registered in the external service or the like instead of the response generating apparatus 10, the receiving unit 43 receives the attribute information, the schedule, or the like related to the user from the external server 200.

Furthermore, the receiving unit 43 may also receive context information related to communication. For example, the receiving unit 43 may also receive a connection status between the response generating apparatus 10 and the various devices (a server in a network, home appliances in a user's home, etc.) as the context information. The connection status between the various devices mentioned here are, for example, information indicating whether two-way communication has been established, the communication standard used for the communication, or the like.

The acquiring unit 40 acquires various kinds of information by controlling each of the processing units described above. For example, the acquiring unit 40 acquires input information that is a trigger for generating a response with respect to the user and acquires context information that is information indicating the situation of the user.

For example, the acquiring unit 40 acquires voice information output by the user as the input information. Specifically, the acquiring unit 40 acquires a speech, such as "please let me know the weather", given by the user and acquires a certain intent included in the speech as the input information.

Alternatively, the acquiring unit 40 may also acquire the detection information detected from an action of the user as the input information. The detection information mentioned here is information detected by the detecting unit 41 via the sensor 20. Specifically, the detection information is an action, such as information indicating that the user looked at the camera in the response generating apparatus 10 and information indicating that the user moves from a room in the user's home to the entrance, performed by the user that can be a trigger for the response generating apparatus 10 generating a response.

Furthermore, the acquiring unit 40 acquires context information. The context information mentioned here is information indicating various situations at the time in which the response generating apparatus 10 generates a response. Furthermore, because the "information indicating the situation of the user", such as action information indicating that the user has looked at the response generating apparatus 10, is included in the context information, the context information can also be the input information.

For example, the acquiring unit 40 acquires, as the context information, the schedule information that is previously registered by the user. Specifically, the acquiring unit 40 acquires the schedule information that has been registered at expected time within a predetermined period of time (for example, within one day, etc.) after the time at which the user gave a speech. For example, the acquiring unit 40 acquires the information C04, as illustrated in FIG. 2, in which information on the visiting destination (place) to which the user is going to move, the time, the purpose, and the like are registered.

Furthermore, the acquiring unit 40 may also acquire, as the context information, the action prediction information that is the information estimated from the action of the user and the information indicating action prediction of the user in the future. Specifically, the acquiring unit 40 acquires the action prediction information indicating that the "user is about to go out" as the information estimated from the action indicating that the user has moved from the room in the user's home to the entrance. For example, when the acquiring unit 40 acquires the action prediction information indicating that the "user is about to go out", the acquiring unit 40 acquires the context information with tagging of "going out (attribute: situation)" based on the information.

Furthermore, the acquiring unit 40 may also acquire, as the context information, the attribute information that is related to the user and that is previously registered by the user. For example, the acquiring unit 40 acquires information, such as a gender, an age, and a dwelling place of the user. Furthermore, the acquiring unit 40 may also acquire, as the attribute information, information indicating the feature of the user indicating that the user has a visual impairment or the like. Furthermore, the acquiring unit 40 may also acquire, as the context information, information on hobbies and tastes of the user based on a use history or the like of the response generating apparatus 10.

Furthermore, the context information described above is an example and all of the pieces of information indicating the situation faced by the user or the response generating apparatus 10 can be the context information. For example, the acquiring unit 40 may also acquire various kinds of physical amounts, such as location information, acceleration, a temperature, gravity, rotation (angular velocity), illuminance, a magnetic field, a pressure, proximity, humidity, and a rotation vector of the response generating apparatus 10, acquired via the sensor 20 as the context information. Furthermore, the acquiring unit 40 may also acquire, by using the installed communication function, the connection status or the like with various devices (for example, information related to establishment of the communication or the using communication standard) as the context information.

Furthermore, in the context information, information related to a dialogue exchanged between the user and another user or between the user and the response generating apparatus 10 may also be included. For example, in the context information, dialogue context information indicating the context of a dialogue exchanged by the user, a domain (weather, news, train operation information, etc.) of the dialogue, an intent of a speech given by the user, attribute information, or the like may also be included.

Furthermore, in the context information, date and time information at the time of the dialogue may also be included. Specifically, the date and time information mentioned here is information on the date, the time, a day of the week, a holiday feature (Christmas, etc.), a time zone (morning, noon, evening, midnight), or the like.

Furthermore, in the context information, information, such as a location in which the user is present and a situation, may also be included. Specifically, the information indicating the location in which the user is present is information related to the location of the user indicating whether the user is in a living room, in a bedroom, or in a children's room in the user's home. Alternatively, in the information indicating the location of the user, information on a specific location indicating a visiting destination of the user may also be included. Furthermore, in the information indicating the visiting destination of the user, information indicating whether the user is in a train, is driving an automobile, or is in school or in the office, or the like may also be included. The acquiring unit 40 acquires these pieces of information by performing two-way communication with, for example, a mobile terminal, such as a smartphone, held by the user.

Furthermore, in the context information, information related to a situation or a feeling estimated from an action of the user may also be included. For example, if the acquiring unit 40 detects that a moving speed of the user is faster than usual, the acquiring unit 40 acquires the context information indicating that the "user is in a hurry".

Furthermore, the acquiring unit 40 may also acquire, as the context information, various kinds of information indicating a situation of the user, such as information on specific household duties performed by the user, the content of the viewing television program, information indicating what the user is eating, and a state of having a conversation with a specific person.

Furthermore, the acquiring unit 40 may also acquire information indicating, based on two-way communication with a home appliance (IoT device, etc.) placed in the user's home, which home appliance is active (for example, whether a power supply is turned on or off), or which home appliance performs what kind of process.

Furthermore, the acquiring unit 40 may also acquire, as the context information, a traffic situation, weather information, or the like in a zone of life of the user based on two-way communication with an external service. The acquiring unit 40 stores each of the pieces of acquired information in the user information table 31 or the shared knowledge table 32. Furthermore, the acquiring unit 40 may also refer to the user information table 31 or the shared knowledge table 32 and appropriately acquire information needed for the processes.

Subsequently, the response generating unit 50 will be described. As illustrated in FIG. 4, the response generating unit 50 includes a meaning understanding unit 51, a dialogue control unit 52, a generating unit 53, and an output control unit 54. The response generating unit 50 generates, by controlling each of the processing unit described above, a response associated with the input information based on the context information acquired by the acquiring unit 40 when, as a trigger, the input information is acquired by the acquiring unit 40.

The meaning understanding unit 51 performs the meaning understanding process on the information acquired by the acquiring unit 40. Specifically, the meaning understanding unit 51 performs, by using the acquiring unit 40, the automatic speech recognition (ASR) process or the natural language understanding (NLU) process on voice information, or the like. The meaning understanding unit 51 resolves the acquired voice into morphemes via the ASR or the NLU or judges whether each of the morphemes is an element having what kind of intent or attribute.

Furthermore, if the intent of the user is unanalyzable from the character string or the like included in the element, the meaning understanding unit 51 may also pass this state to the generating unit 53. For example, as a result of analysis, if information that is not able to be estimated from a speech of the user is included, the meaning understanding unit 51 passes this content to the generating unit 53. In this case, the generating unit 53 may also generate a response indicating to request the user to give a speech accurately once again related to unclear information.

The dialogue control unit 52 controls the dialogue process with the user based on the element analyzed by the meaning understanding unit 51. For example, the dialogue control unit 52 extracts an element that can be the input information from the element analyzed by the meaning understanding unit 51 or the image information, various kinds of the sensor information, and the like acquired by the acquiring unit 40. Then, the dialogue control unit 52 controls the generating unit 53 so as to generate a response associated with the input information. Furthermore, the dialogue control unit 52 accesses the external server 200 and may also acquire, based on the response rule in accordance with the input information by referring to, for example, the response rule table 33, information related to the external service or perform a process of establishing two-way communication with the external server 200.

The generating unit 53 receives a speech generating instruction from the dialogue control unit 52 and generates a response associated with the instruction. As described above, the generating unit 53 generates a temporary response associated with the input information, and furthermore, generates, based on the context information, a response that is actually output to the user by deleting and replacing the element included in the temporary response or by adding an element to the temporary response. Furthermore, if the input information is so-called asking again, the generating unit 53 generates a new response based on the existing response. The asking again mentioned here is a reaction of the user with respect to the response that has been output from the response generating apparatus 10 to the user. In this case, the generating unit 53 generates a new response based on the existing information without performing the generating process or the like on the temporary response that will be described later.

In a case in which, for example, the input information is a new speech of the user or is autonomous information exhibition based on the context information indicating the situation in which the user is about to go out, the generating unit 53 determines that this is not asking again but is a normal speech generating instruction. In this case, the generating unit 53 refers to, for example, the response rule table 33 and generates a temporary response based on the response rule in accordance with the input information.

Specifically, when the generating unit 53 acquires, as the input information, the element in which the tag of "Check-Whether" that indicates an intent of asking weather information is granted, the generating unit 53 generates a temporary response including the weather information that is in accordance with the intent of the user. At this time, the generating unit 53 generates the temporary response based on various kinds of context information included in the speech given by the user. For example, as illustrated in FIG.

1, when the user gives a speech indicating that "please let me know the weather today in Yokohama", the generating unit 53 generates a temporary response including the weather information on "Yokohama" and "today".

Furthermore, the generating unit 53 may also acquire, instead of generating a temporary response by itself, the temporary response (speech source information) generated by the external server 200. In this case, the generating unit 53 performs a process of resolving the acquired speech source information into each of the elements as a pre-process of performing the response generating process according to the present disclosure.

Figure 10:
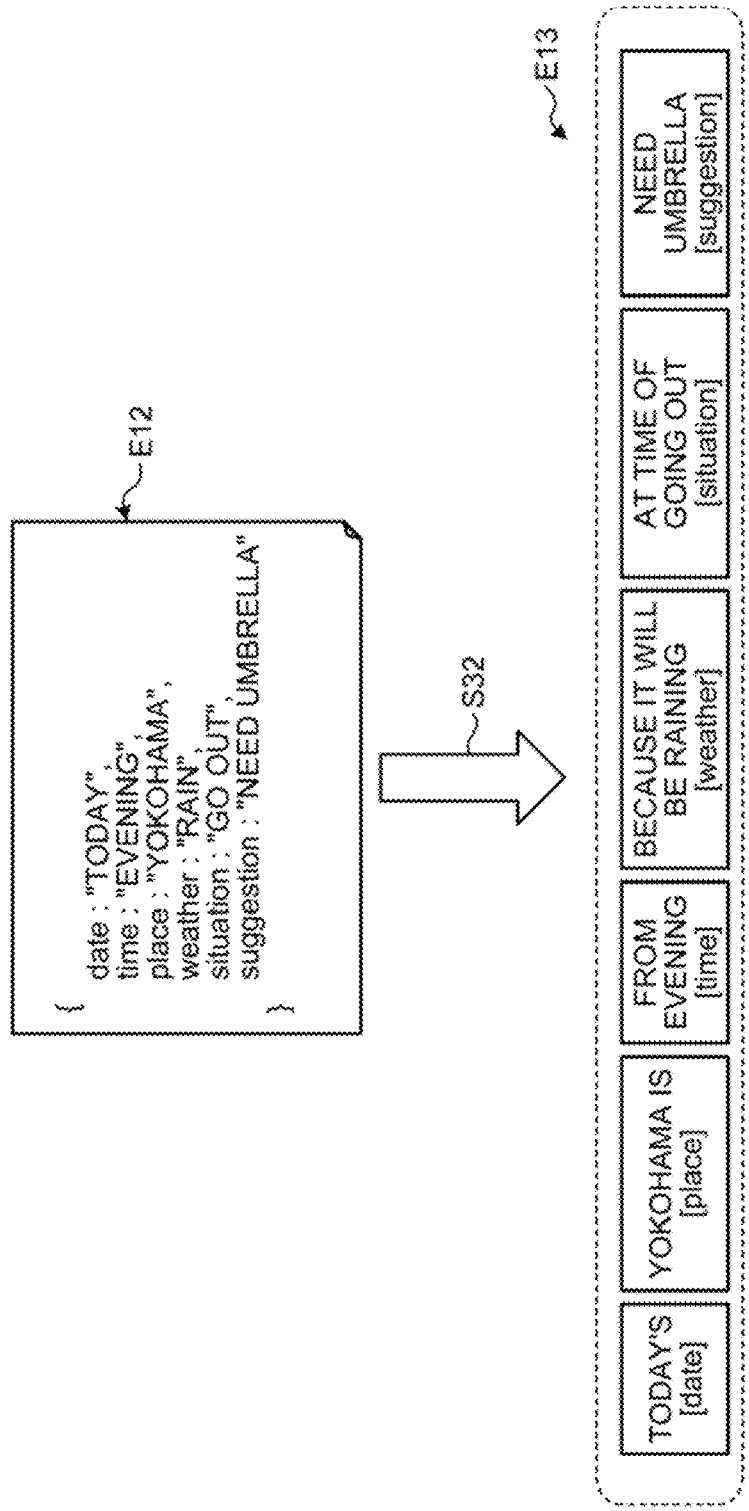
FIG. 10 is a diagram (2) illustrating an example of the generating process according to the first embodiment of the present disclosure.

This point will be described with reference to FIG. 9 and FIG. 10. FIG. 9 is a diagram (1) illustrating an example of the generating process according to the first embodiment of the present disclosure. FIG. 9 illustrates an example in a case in which speech source information E11 acquired from the external server 200 that provides the weather information is subjected to sentence conversion.

In the example illustrated in FIG. 9, the external server 200 that receives a request for information related to the weather in "Yokohama" "today" from the response generating apparatus 10, the external server 200 sends, back to the response generating apparatus 10 in response to the request, the speech source information E11 that has been subjected to sentence conversion and that indicates that "you need an umbrella because it will be raining from the evening in Yokohama".

In this case, the generating unit 53 performs natural language processing on the speech source information E11, divides the sentence of the speech source information E11 into units of phrases, and acquires a semantic concept (attribute) of each of the phrases from the natural language processing (Step S31). For example, the generating unit 53 refers to dictionary data of a word semantic concept that is installed in the response generating apparatus 10 or that is included in the external server 200, and then, determines the attribute for each phrase.

Consequently, the generating unit 53 can acquire speech source information E13 formed of a combination of the character string (for example, "today") in each of the elements (phrases) and the attribute (for example "attribute: date").

Furthermore, in some cases, depending on the process performed by the external server 200, speech source information that is not subjected to sentence conversion may also be generated. This point will be described with reference to FIG. 10. FIG. 10 is a diagram (2) illustrating an example of the generating process according to the first embodiment of the present disclosure. FIG. 10 illustrates an example of a case in which speech source information E12 acquired from the external server 200 that provides weather information is not subjected to sentence conversion. For example, the speech source information E12 is expressed in the form of JavaScript (registered trademark) Object Notation (JSON).

In this case, the generating unit 53 generates a sentence by using each of the elements included in the speech source information E12 while maintaining information (attribute information, etc.) associated with the existing speech source information E12 (Step S32). Furthermore, at the time of performing the sentence conversion, the generating unit 53 may also hold information indicating that each of the phrases in the original information is generated from what kind of attribute ("attribute: date", etc.).

Accordingly, the generating unit 53 can acquire, similarly to FIG. 9, speech source information E13 formed of the combination of the character string of each of the elements (phrases) and the attributes.

The generating unit 53 generates, based on the acquired temporary response, a response that is actually output to the user. As an example, the generating unit 53 generates a response associated with the input information by deleting the element that overlaps with the context information included in the temporary response that is a response temporarily generated in association with the input information.

For example, as illustrated in FIG. 1 and FIG. 2, if overlapping elements are present in the speech source information that is the temporary response and in the shared knowledge, such as the content of the speech given by the user or the schedule, the generating unit 53 generates a response associated with the input information by deleting the overlapping elements.

At this time, if the generating unit 53 accepts, from the user, a reaction that is related to the element deleted from the temporary response and that is with respect to the generated response, the generating unit 53 may also generate a second response associated with the reaction based on the deleted element.

Figure 11:
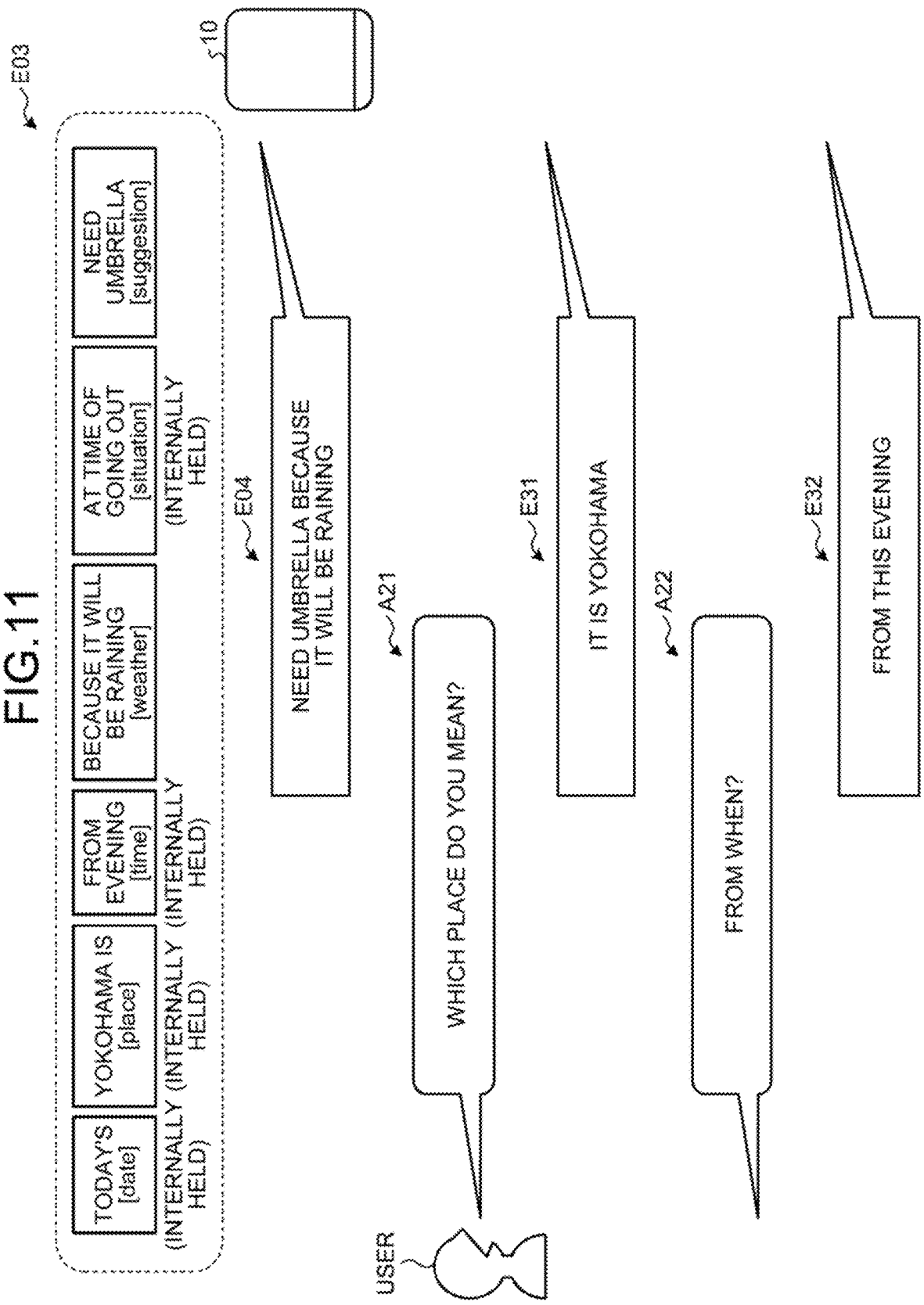
FIG. 11 is a diagram (3) illustrating an example of the generating process according to the first embodiment of the present disclosure.

This point will be described with reference to FIG. 11. FIG. 11 is a diagram (3) illustrating an example of the generating process according to the first embodiment of the present disclosure. The example illustrated in FIG. 11 indicates the situation in which the user further gives a speech of a question with respect to the response generating apparatus 10 that has output the response E04 illustrated in FIG. 2.

As illustrated in FIG. 11, the response generating apparatus 10 deletes the element having the [date] attribute, the element having the [place] attribute, the element having the [time] attribute, and the element having the [situation] attribute from the speech source information E03, and then, generates the response E04. At this time, the response generating apparatus 10 internally holds the deleted information in the storage unit 30 or the like. For example, the response generating apparatus 10 internally holds the deleted information until the timing that is determined to be the end of a series of speeches (for example, referred to as a "session", etc.).

After this, the response generating apparatus 10 accepts a voice A21 having the content indicating "which place do you mean?" from the user. Namely, the response generating apparatus 10 accepts so-called asking again from the user. The response generating apparatus 10 performs the natural language processing on the voice A21 and recognizes that the voice A21 is a speech having the intent to ask the "place".

In this case, the response generating apparatus 10 calls the held element having the [place] attribute and generates a response that is output to the user.

Specifically, the response generating apparatus 10 generates a sentence for outputting "Yokohama" that is the place associated with the weather information related to the response E04 and outputs a response E31 indicating that "it is Yokohama".

Furthermore, after this, the response generating apparatus 10 accepts a voice A22 having the content indicating "from when?" from the user. The response generating apparatus 10 performs the natural language processing on the voice A22 and recognizes that the voice A22 is a speech having the intent to ask "date" and "time".

In this case, the response generating apparatus 10 calls the held element having the [date] attribute and the element having the [time] attribute and generates a response that is output to the user. Specifically, the response generating apparatus 10 generates a sentence for outputting "today" and "evening" that are the date and time associated with the weather information related to the response E04 and output a response E32 indicating that "it is from this evening".

In this way, the response generating apparatus 10 internally holds the information deleted from the speech source information until it is determined that the series of dialogues has ended. Then, when the response generating apparatus 10 accepts a question from the user, the response generating apparatus 10 generates a new response based on the held information. Consequently, the response generating apparatus 10 can have a flexible exchange with the user while generating a simple response by sending back needed information in a case of receiving a question from the user. Furthermore, the series of dialogues (sessions) is ended in a case in which a dialogue is paused for a predetermined period of time (for example, for one minutes, five minutes, etc.) after, for example, the response generating apparatus 10 detects the input information or the response generating apparatus 10 outputs the response.

Furthermore, the generating unit 53 may also determine the element to be deleted from the temporary response in accordance with the number of times the reaction related to the element deleted from the temporary response is accepted from the user.

For example, it is assumed that the generating unit 53 determines that there is a high possibility of asking again the attribute of "time" from the user with respect to the number of times a response has been generated. In this case, even if the element having the attribute of "time" is obvious (overlaps), the generating unit 53 does not need to delete the element having the attribute of "time" in the response generating process next time. Consequently, regarding the information that is likely to be frequently asked by the user, the generating unit 53 can generate a response without deleting the information from the beginning; therefore, the generating unit 53 can generate a response that is optimized for the user.

Subsequently, a description will be given of an example in which the generating unit 53 replaces the information included in the temporary response. For example, the generating unit 53 generates a response associated with the input information by changing a temporary response that is the response temporarily generated in association with the input information to a different expression based on the context information.

Specifically, the generating unit 53 generates a response associated with the input information by changing a specific numerical value or time included in the temporary response to an abstract expression.

More specifically, when information indicating the situation of the user at the time of acquiring the input information is acquired as the context information, the generating unit 53 decides an abstract expression that replaces the specific numerical value or the time included in the temporary response based on the information indicating the situation of the user.

The abstract expression mentioned here is an example for simply expressing redundant speech source information. For example, the generating unit 53 replaces the element (phrase), such as a specific numerical value, a proper noun, or katakana, that is assumed to take time for a speech with demonstrative pronoun or an adjective conforming to the situation.

For example, if a numerical value is included in the speech source information, the generating unit 53 may also replace the content of the speech with a simple expression by rounding off the numerical value or using an abstract expression, such as "roughly", "nearly", or "about".

Furthermore, regarding the noun that has a certain long name and that appeared in immediately before the user speech or the response, the generating unit 53 may also replace the noun with a more simply expression. Specifically, if a train that has a certain long route name and that appeared in immediately before the user speech or the response, the generating unit 53 may also replace the train with an expression using a demonstrative pronoun, such as "this train" or "that train".

Furthermore, the generating unit 53 may also generate a response having a simple expression from a redundant expression by replacing the type of information to be output. For example, the generating unit 53 may also output, as a response, an image showing the sun instead of outputting a voice related to weather information indicating that the "weather is sunny tomorrow". Furthermore, instead of outputting a voice of a redundant name of a person as a response, the generating unit 53 may also output an image of the subject person. In this case, the generating unit 53 may also request the external server 200 to search for the name of the person and output the image acquired from the external server 200 to the display or the like of the own device.

Figure 12:
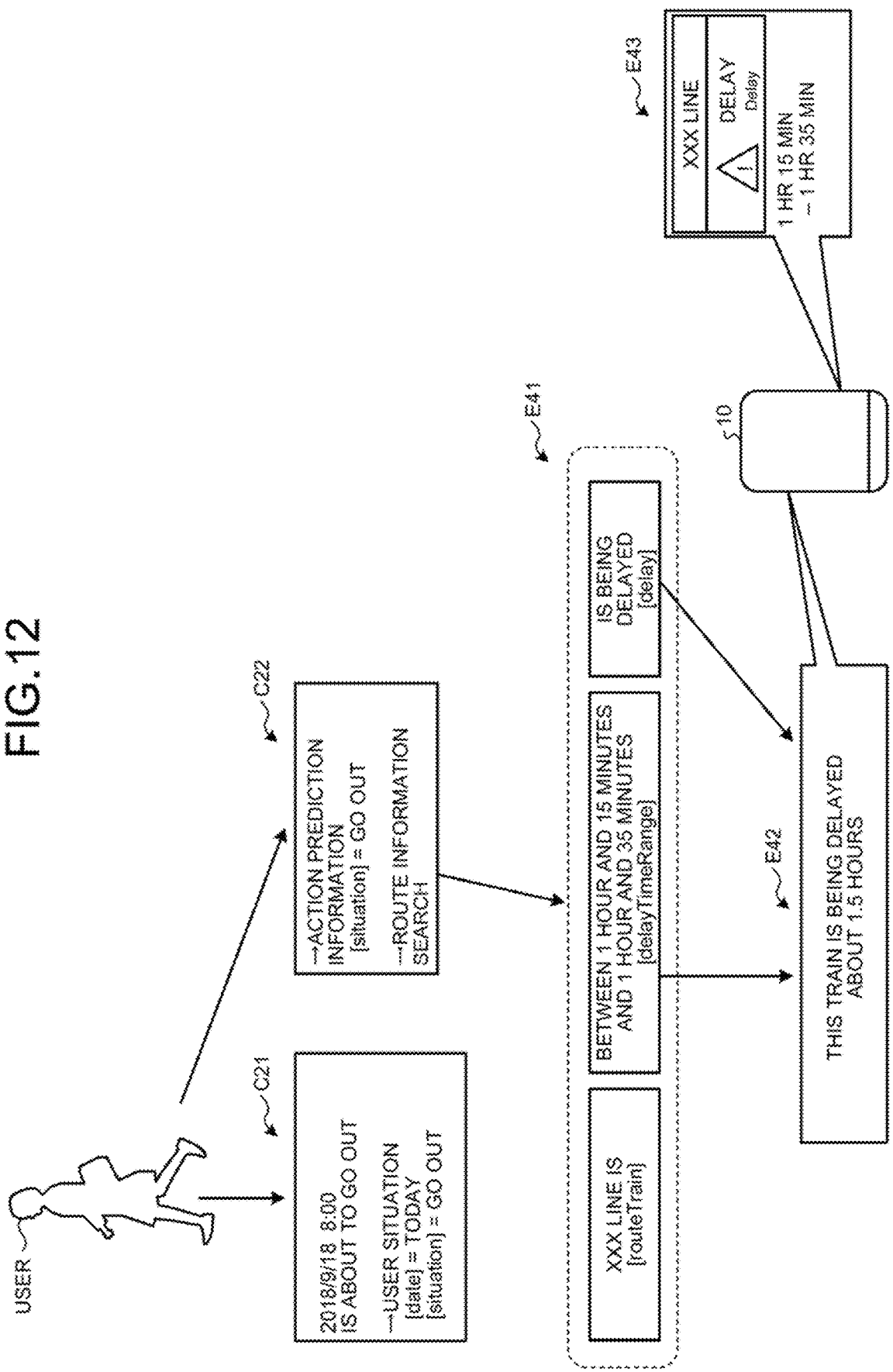
FIG. 12 is a diagram (4) illustrating an example of the generating process according to the first embodiment of the present disclosure.

A specific example of the above described process will be described with reference to FIG. 12. FIG. 12 is a diagram (4) illustrating an example of the generating process according to the first embodiment of the present disclosure.

In the example illustrated in FIG. 12, the response generating apparatus 10 acquires information C21 including the context indicating that the user is about to go out. The information C21 includes the context information, such as the date (attribute: date) and the situation (attribute: situation), in the user situation indicating that the user is about to go out.

Furthermore, the response generating apparatus 10 acquires information C22 including the action prediction information indicating that the user is about to go out. Furthermore, it is assumed that, in the response generating apparatus 10, the rule that traffic information (route information) is autonomously responded is set by using the action prediction information indicating that the user is about to go out as the input information.

In this case, the response generating apparatus 10 generates speech source information E41 that is a temporary response based on the input information obtained from the action prediction information included in the information C22 and based on the context information, such as the user situation included in the information C21. For example, the response generating apparatus 10 sends the date or the time planned by the user to go out, the route information that is usually used by the user, or the like to the external server 200 and generates the speech source information E41 based on a reply from the external server 200.

As illustrated in FIG. 12, the speech source information E41 includes elements having "XXX line is (attribute: routeTrain)", "between one hour and 15 minutes and one hour and 35 minutes (attribute: delayTimeRange)", and "being delayed (attribute: situation)".

In this case, the response generating apparatus 10 replaces, in the speech source information E41, the information indicating "XXX line" that is obvious for the user with "this train". Furthermore, the response generating apparatus 10 replaces a redundant expression, such as "between one hour and 15 minutes and one hour and 35 minutes", with an abstract expression indicating "about an hour and a half".

In this way, the response generating apparatus 10 generates the response E42 that is more simple expression as compared with the speech source information E41 indicating that "this train is delayed about an hour and a half". Consequently, the response generating apparatus 10 can generate a response having a simple expression without decreasing the quality of the information to be delivered.

Furthermore, regarding the replaced information, the response generating apparatus 10 may also output and complement the information having the type that is different from the voice. As an example, the response generating apparatus 10 generates an image, such as a response E43. In the response E43, information that is related to specific time and that is the information before replacing the speech source information E41, the name of the route name of the train, and the like are displayed. In this way, the response generating apparatus 10 may also separately generate a response that complements the replaced information. Consequently, the response generating apparatus 10 can perform a flexible response output process responding to both of the demands for a user who desires more accurate information and a user who wants to allow the response generating apparatus 10 to output a simple response. Furthermore, in a case in which, regarding the information that has been replaced with abstract information, the response generating apparatus 10 receives asking again, such as "detailed time?", from the user, the response generating apparatus 10 may also output specific information that is before the replacement.

Furthermore, the example illustrated in FIG. 12 is an example and the generating unit 53 may also refer to accessible dictionary data, corpus, or the like and appropriately use various kinds of abstract expressions. An example of the abstract expression includes, for example, the numerical values of fractions of "2980 yen" is expressed as "about 3000 yen", the numerical values of the latitude and the longitude are expressed as "the vicinity of XXX station", a temperature that is below a predetermined threshold is expressed as "chilly".

Subsequently, a description will be given of an example in which the generating unit 53 grants a temporary response to information. For example, the generating unit 53 grants the element included in the context information to the temporary response that is a response temporarily generated in association with the input information, and then, generates a response associated with the input information.

Specifically, the generating unit 53 calculates the degree of conformance between the element included in the context information and the user; decides, based on the calculated degree of conformance, the element that is added to the temporary response; and generates a response associated with the input information.

Figure 13:
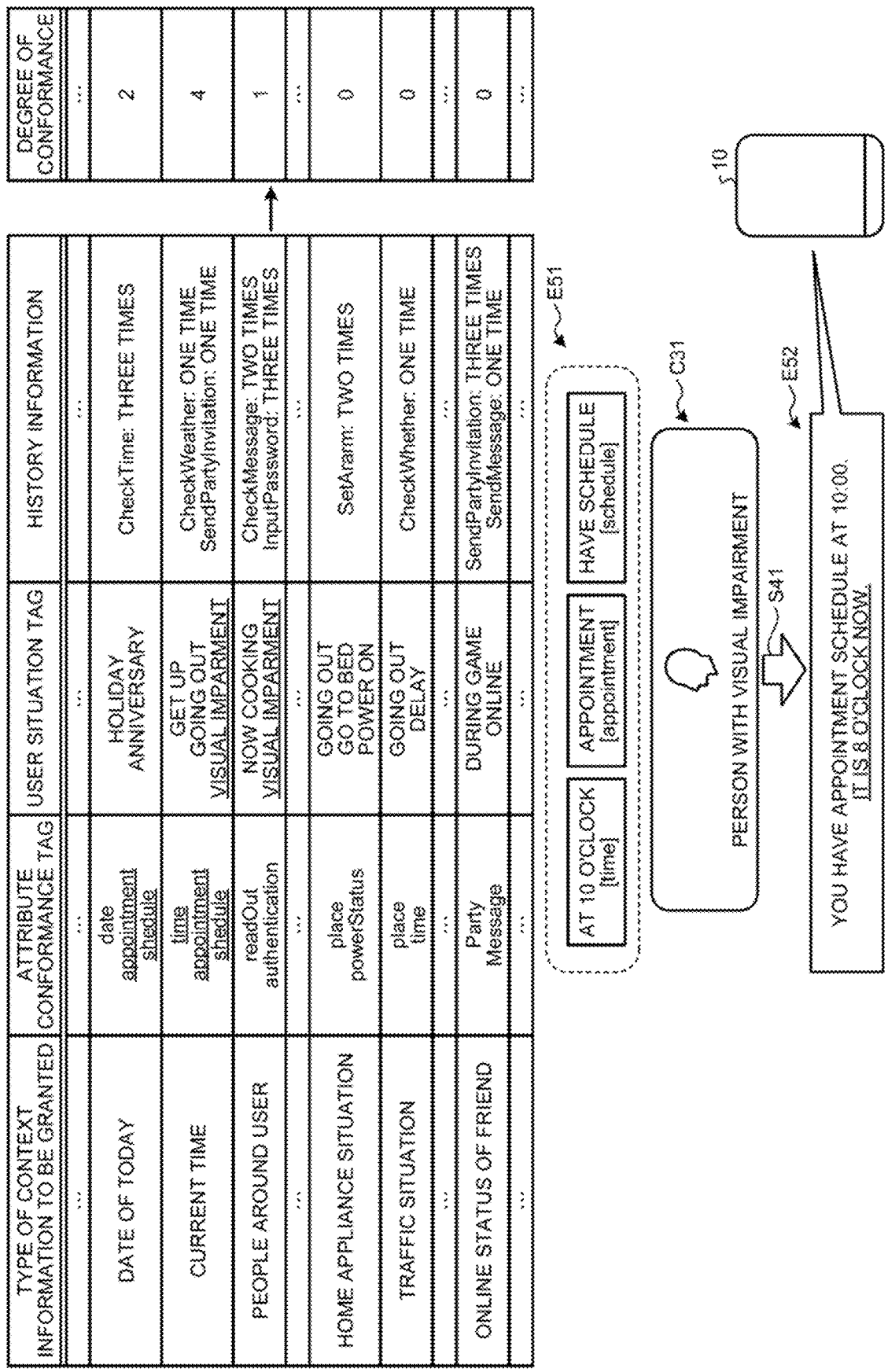
FIG. 13 is a diagram (1) illustrating an example of a process of generating a response by granting context information.

A specific example of the above described process will be described with reference to FIG. 13 to FIG. 16. FIG. 13 is a diagram (1) illustrating an example of a process of generating a response by granting context information.

In the example illustrated in FIG. 13, the response generating apparatus 10 refers to the grant rule table 34 and decides the type of the context information to be granted with respect to the speech source information. Specifically, the response generating apparatus 10 checks speech source information E51 and the information included in the information C31 that is the context information, such as the attribute information related to the user, against the information that is set in the grant rule table 34, and then, calculates the degree of conformance of the context information that is to be granted. Then, the response generating apparatus 10 grants the context information based on the calculated degree of conformance.

In FIG. 13, it is assumed that the response generating apparatus 10 generates speech source information E51 having each of the elements of "at 10:00 (attribute: time)", "appointment (attribute: appointment)", and "have a schedule (attribute: schedule)". Furthermore, the response generating apparatus 10 acquires information C31 indicating the context indicating that the user targeted for an output of a response is a "person with a visual impairment".

At this time, the response generating apparatus 10 refers to how much degree of conformance is present between the attribute information of each of the elements included in the speech source information E51 and the context information "visual impairment" in the grant rule table 34. For example, in the grant rule table 34, in the row of the "date of today" in the "type of context information to be granted", the number of pieces of conforming information in the "attribute conformance tag" is "two". In this case, the response generating apparatus 10 calculates that the degree of conformance of the context information of the "date of today" to be granted is "2".

Similarly, in the row of the "current time" in the "type of context information to be granted", the number of pieces of conforming information in the "attribute conformance tag" is "three", and furthermore, the number of pieces of conforming information in the "user situation tag" is "one". In this case, the response generating apparatus 10 calculates that the degree of conformance of context information of the "current time" to be granted is "4". Similarly, the response generating apparatus 10 calculates the degree of conformance related to each of the fields in the "type of context information to be granted" stored in the grant rule table 34.

As the result of the calculating process described above, the response generating apparatus 10 extracts the context information of the "current time" that is to be granted and that is calculated to be the highest degree of conformance (Step S41). Then, the response generating apparatus 10 generates a response E52 in which the element indicating the "current time" is further granted to the speech source information E51. Specifically, in the response E52, the current time is granted in addition to the information that is exhibited to the user and that indicates that "you have an appointment schedule at 10:00. It is 8:00.".

Consequently, because the response generating apparatus 10 can generate a response by adding the current time to the information that is originally output to the user, such as a person with a visual impairment, who is hard to visually check the current time, the response generating apparatus 10 can exhibit a more kind response for the user.

Furthermore, in the example illustrated in FIG. 13, the response generating apparatus 10 granted a single piece of context information having the highest degree of conformance; however, a larger amount of context information may also be granted.

In this way, the response generating apparatus 10 can generate a response by granting useful context information, which is not recognized by the user though, with respect to the temporary response. Furthermore, the response generating apparatus 10 can grant appropriate context information in accordance with the user and the situation by filtering the context information to be granted in accordance with the condition of the temporary response, the situation of the user, or the like.

Figure 14:
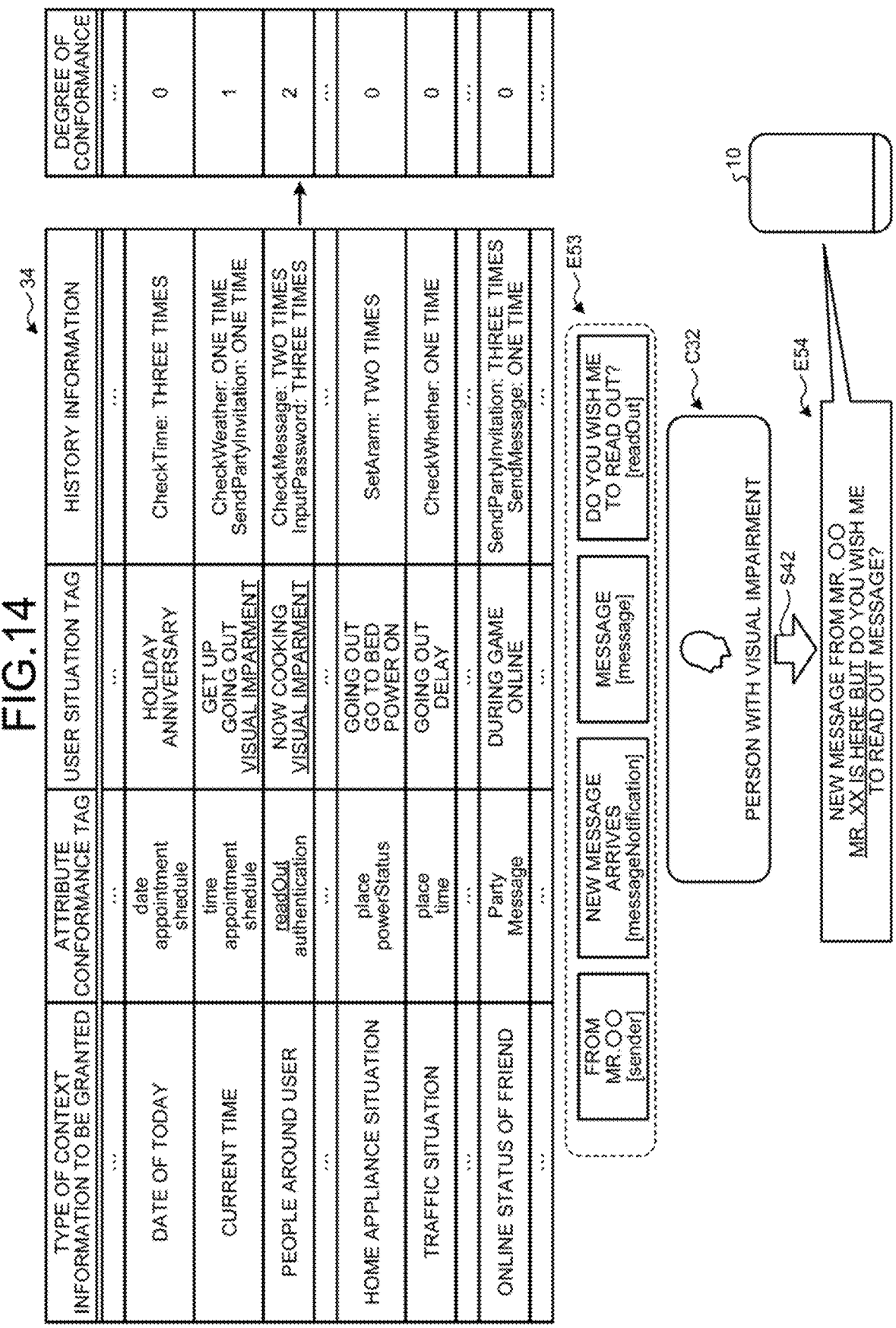
FIG. 14 is a diagram (2) illustrating an example of a process of generating a response by granting context information.

Another example of the above described process will be described with reference to FIG. 14. FIG. 14 is a diagram (2) illustrating an example of the process of generating a response by granting the context information.

In the example illustrated in FIG. 14, similarly to FIG. 13, the response generating apparatus 10 refers to the grant rule table 34 and decides the type of the context information to be granted with respect to the speech source information. Specifically, the response generating apparatus 10 checks speech source information E53 and the information included in the information C32 that is the context information, such as the attribute information on the user, against the information that is set in the grant rule table 34, and then, calculates the degree of conformance of the context information to be granted. Then, the response generating apparatus 10 grants the context information based on the calculated degree of conformance.

In FIG. 14, it is assumed that the response generating apparatus 10 generates speech source information E53 having each of the elements of "from Mr. 00 (attribute: sender)", "a new message arrives" (attribute: messageNotification)", "message (attribute: message)", and "do you wish me to read out (attribute: readOut)". Furthermore, the response generating apparatus 10 acquires information C32 indicating the context indicating that the user targeted for an output of a response is a "person with a visual impairment".

At this time, the response generating apparatus 10 refers to how much degree of conformance is present between the attribute information of each of the elements included in the speech source information E53 and the context information "visual impairment" in the grant rule table 34. For example, in the grant rule table 34, in the row of the "current time" in the "type of context information to be granted", the number of pieces of conforming information in the "attribute conformance tag" is "zero", and furthermore, the number of pieces of conforming information in the "user situation tag" is "one". In this case, the response generating apparatus 10 calculates that the degree of conformance of the context information of the "current time" to be granted is "1". Similarly, in the row of the "people around the user" in the "type of context information to be granted", the number of pieces of conforming information in the "attribute conformance tag" is "one", and furthermore, the number of pieces of conforming information in the "user situation tag" is "one". In this case, the response generating apparatus 10 calculates that the degree of conformance of the context information of the "current time" to be granted is "2". Similarly, the response generating apparatus 10 calculates the degree of conformance related to each of the fields in the "type of context information to be granted" stored in the grant rule table 34.

As the result of the calculating process described above, the response generating apparatus 10 extracts the context information of "people around the user" that is to be granted and that is calculated to be the highest degree of conformance (Step S42). Then, the response generating apparatus 10 generates a response E54 in which the element indicating the "people around the user" is further granted to the speech source information E53. Specifically, in the response E54, people around the user (in the example illustrated in FIG. 14, "Mr. xx") is granted to the information that is exhibited to the user and that indicates that "a message arrived from Mr. oo. Mr. xx is here but do you wish me to read out the message?".

Consequently, because the response generating apparatus 10 can generate a response by adding the current time to the information that is originally output to the user, such as a person with a visual impairment, who is hard to visually check the around situation, the response generating apparatus 10 can exhibit a more kind response for the user. For example, the response generating apparatus 10 can previously check with the user in order to avoid the message that is not herd by others from being erroneously read out.

Figure 15:
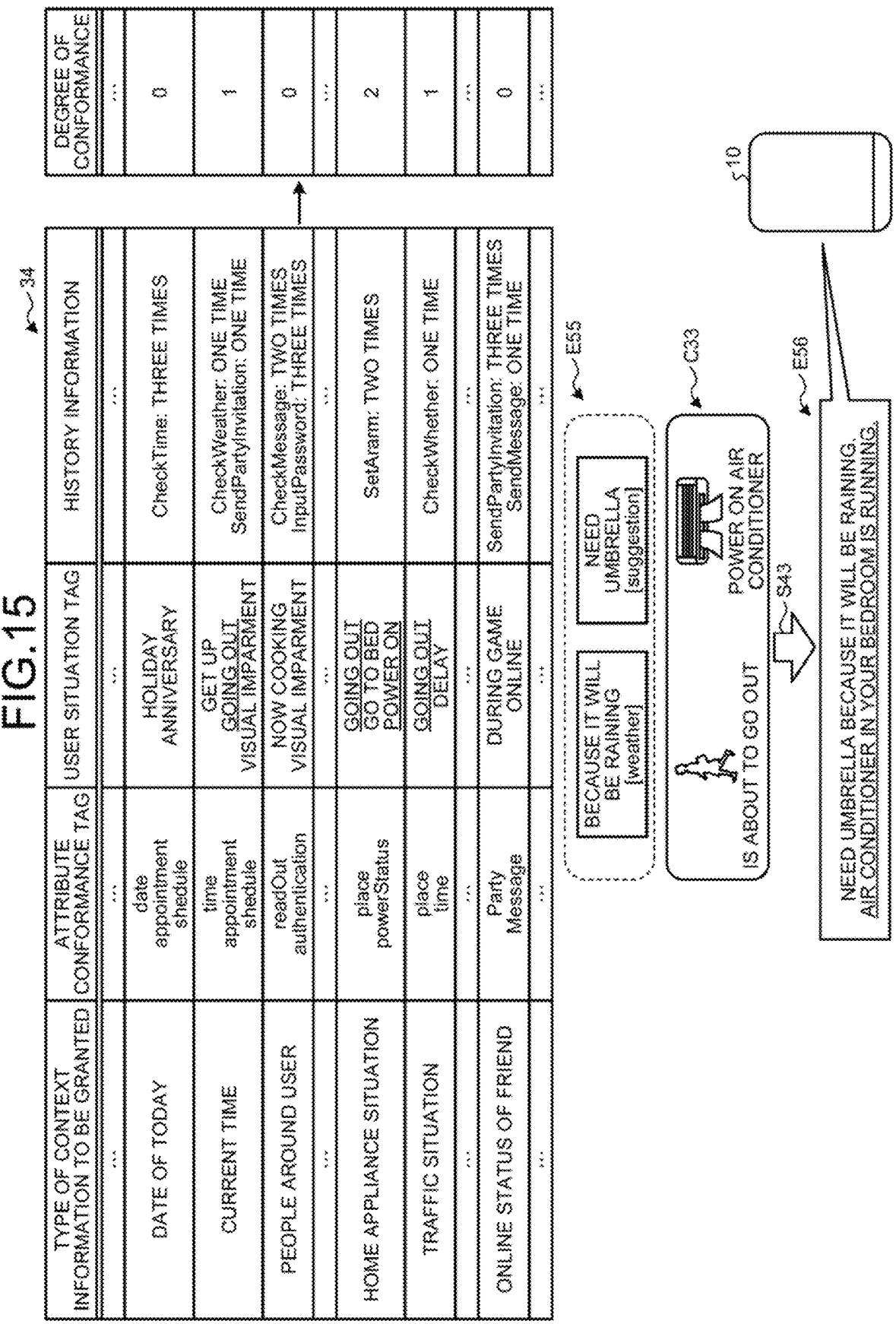
FIG. 15 is a diagram (3) illustrating an example of a process of generating a response by granting context information.

Furthermore, the response generating apparatus 10 may also calculate the degree of conformance by combining a plurality of pieces of context information. This point will be described with reference to FIG. 15. FIG. 15 is a diagram (3) illustrating an example of a process of generating a response by granting the context information.

In the example illustrated in FIG. 15, the response generating apparatus 10 recognizes that the user is about to go out based on the action prediction information on the user included in the information C33. Then, it is assumed that the response generating apparatus 10 generates, as a response associated with the input information, speech source information E55 having each of the elements of "because it is raining (attribute: weather)" and "need an umbrella (attribute: suggestion)". Furthermore, the response generating apparatus 10 acquires, in the user's home of the user targeted for an output of the response, the context information indicating that "the power supply of the air conditioner is turned on".

At this time, the response generating apparatus 10 refers to how much degree of conformance is present between the attribute information of each of the elements included in the speech source information E55 and the context information indicating that the context information of "the power supply of (the home appliance in the user's home) is turned on" in the grant rule table 34. For example, in the grant rule table 34, in the row of the "home appliance situation" in the "type of context information to be granted", the number of pieces of conforming information in the "attribute conformance tag" is "zero", and furthermore, the number of pieces of conforming information in the "user situation tag" is "two". In this case, the response generating apparatus 10 calculates that the degree of conformance of the context information of "home appliance situation" is "2". Similarly, the response generating apparatus 10 calculates the degree of conformance related to each of the fields in the "type of context information to be granted" stored in the grant rule table 34.

As the result of the calculating process described above, the response generating apparatus 10 extracts the context information "home appliance situation" that is to be granted and that is calculated to be the highest degree of conformance (Step S43). Then, the response generating apparatus 10 generates a response E56 in which the element indicating the "home appliance situation" is further granted to the speech source information E55. Specifically, in the response E56, the home appliance situation is granted in addition to the information that is exhibited to the user and that indicates that "you need an umbrella because it is raining. The air conditioner in the bed room is running.".

Consequently, because the response generating apparatus 10 can grasp the home appliance situation before the user is about to go out, it is possible to prevent an accident, such as forgetting to turn off the power supply.

Figure 16:
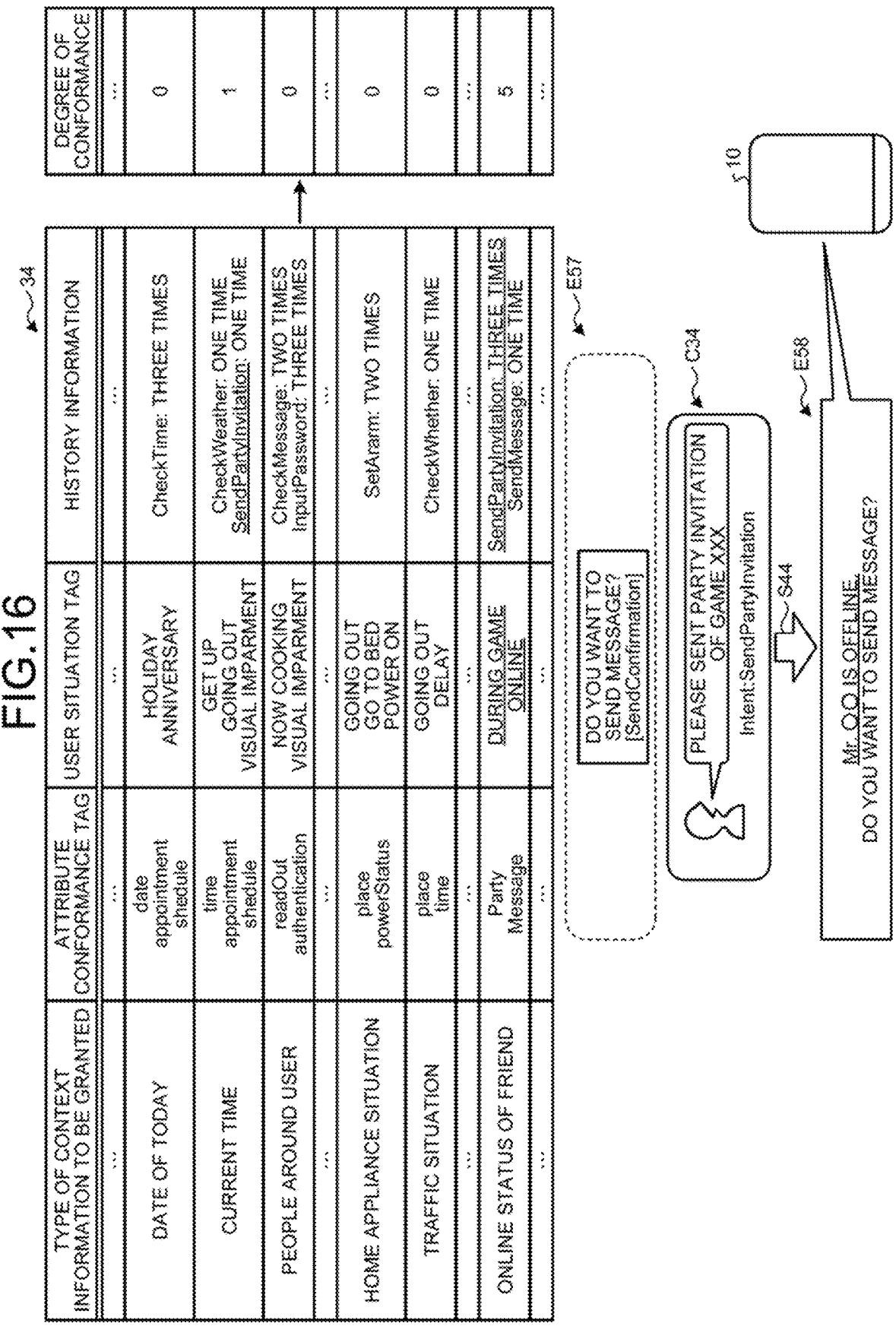
FIG. 16 is a diagram (4) illustrating an example of a process of generating a response by granting context information.

Furthermore, the response generating apparatus 10 may also calculate the degree of conformance by using the information other than the attribute conformance tag or the user situation tag. This point will be described with reference to FIG. 16. FIG. 16 is a diagram (4) illustrating an example of a process of generating a response by granting the context information.

In the example illustrated in FIG. 16, in addition to the process described with reference to FIG. 13 to FIG. 15, the response generating apparatus 10 calculates the degree of conformance by using the number of intents of the speech given by the user and the number of times thereof in a case in which the context information is granted, or, the number of times of asking again in a case in which the context information is granted due to asking again performed by the user.

FIG. 16 illustrates the situation in which the user requests the response generating apparatus 10 to "send an invitation to a party of the game XXX". In this case, the response generating apparatus 10 determines that the intent of the user is "invitation to a game (SendPartyInvitation)" by way of a meaning recognition process of the voice included in information C34. Furthermore, in the information C34, for example, it is assumed that information indicating that the user "is playing a game", "is online", or the like.

In contrast, the response generating apparatus 10 generates speech source information E57 having the element indicating that "do you want to send (attribute: SendCofirmation)" as a temporary response.

Then, similarly to FIG. 13 to FIG. 15, the response generating apparatus 10 refers to how much degree of conformance is present between the attribute information of each of the elements included in the speech source information E57 and the context information in the grant rule table 34. Furthermore, the response generating apparatus 10 calculates the degree of conformance by referring to history information that includes the intent included in the speech given by the user in the past and the number of times the speech has been given.

For example, in the grant rule table 34, in the row of the "online situation of the friend" in the "type of context information to be granted", the number of pieces of conforming information in the "attribute conformance tag" is "zero", and furthermore, the number of pieces of conforming information in the "user situation tag" is "two" and the number of pieces of conforming information in the "history information" is "three (three times)". In this case, the response generating apparatus 10 calculates that the degree of conformance of the context information of the "online situation of the friend" to be granted is "5". Similarly, the response generating apparatus 10 calculates the degree of conformance related to each of the fields in the "type of context information to be granted" stored in the grant rule table 34.

As the result of the calculating process described above, the response generating apparatus 10 extracts the context information of the "online situation of the friend" that is to be granted and that is calculated to be the highest degree of conformance (Step S44). Then, the response generating apparatus 10 generates a response E58 in which the element indicating the "online situation of the friend" is further granted to the speech source information E57. Specifically, in the response E58, the online situation of another user who is going to be invited is granted in addition to the information that is exhibited to the user and that indicates that "Mr. oo is offline. Do you wish to send a message".

Consequently, when the user allows the response generating apparatus 10 to perform some sort of process, such as sending a message, the response generating apparatus 10 can generate a response in which information that is not able for the user to know is granted. Furthermore, because the response generating apparatus 10 grants information in accordance with the history information, the response generating apparatus 10 can more easily grant the content that is usually asked or concerned by the user. Thus, because the response generating apparatus 10 can grant, with priority, the information desired to know by the user, it is possible to improve convenience related to the speech system.

Furthermore, the processes illustrated in FIG. 13 to FIG. 16 are examples, and the response generating apparatus 10 can generate various kinds of information conforming to the user by setting the context information to be granted and the techniques for calculating the degree of conformance in various ways. For example, by accumulating the pieces of history information of the user, the response generating apparatus 10 can conduct flexible dialogue appropriate to the situation, such as granting the location information on a user's father who is on a way to user's home in addition to recipe information at the time at which the user asked a cooking recipe.

A description will be continued by referring back to FIG. 4. The output control unit 54 controls an output of the response generated by the generating unit 53. For example, the output control unit 54 converts the response formed of a character string generated by the generating unit 53 to voice data. Alternatively, the output control unit 54 converts the response having the image information generated by the generating unit 53 to image data.

The output unit 60 is a mechanism for outputting various kinds of information. For example, the output unit 60 is a speaker or a display. For example, the output unit 60 converts the voice data generated by the output control unit 54 to voice output. Furthermore, the output unit 60 outputs the image data generated by the output control unit 54 to the display. Furthermore, the output unit 60 may also output the response in various mode, such as displaying the voice data generated by the output control unit 54 on the display by performing character recognition.

1-4. Flow of Information Processing According to the First Embodiment

Figure 17:
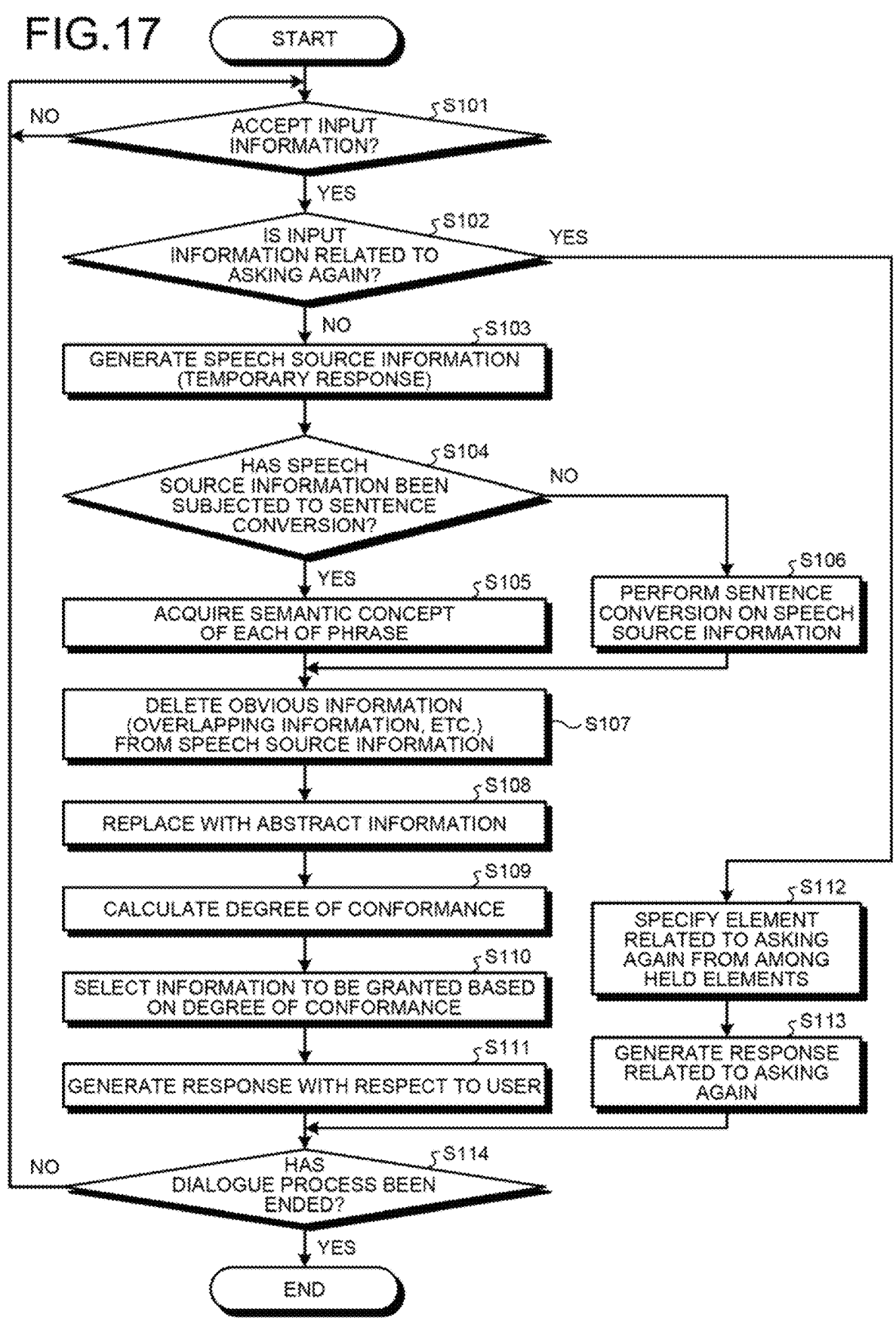
FIG. 17 is a flowchart illustrating the flow of a process according to the first embodiment of the present disclosure.

In the following, the flow of the information processing according to the first embodiment will be described with reference to FIG. 17. FIG. 17 is a flowchart illustrating the flow of the process according to the first embodiment of the present disclosure.

As illustrated in FIG. 17, the response generating apparatus 10 determines whether the input information has been accepted (Step S101). When the input information is not accepted (No at Step S101), the response generating apparatus 10 waits until the response generating apparatus 10 accepts the input information.

In contrast, when the input information has been accepted (Yes at Step S101), the response generating apparatus 10 determines whether the input information is related to asking again (Step S102). When the input information is not related to asking again (No at Step S102), the response generating apparatus 10 generates speech source information (temporary response) associated with the input information (Step S103).

Subsequently, the response generating apparatus 10 determines whether the speech source information is subjected to sentence conversion (Step S104). When the speech source information is subjected to sentence conversion (Yes at Step S104), the response generating apparatus 10 analyzes the sentence and acquires a semantic concept of each of the phrase constituting the sentence (Step S105).

In contrast, if the speech source information is not subjected to sentence conversion (No at Step S104), the response generating apparatus 10 performs sentence conversion on the speech source information based on each of the elements included in the speech source information (Step S106).

Subsequently, the response generating apparatus 10 deletes obvious information (information that overlaps with the context information, etc.) from the speech source information (Step S107). Furthermore, the response generating apparatus 10 replaces the obvious information or the like included in the speech source information with abstract information (Step S108).

Furthermore, the response generating apparatus 10 calculates the degree of conformance for each of the pieces of context information to be granted (Step S109). Then, the response generating apparatus 10 selects the context information to be granted to the speech source information based on the degree of conformance (Step S110).

The response generating apparatus 10 generates a response with respect to the user based on the edited speech source information by way of the processes at Step S107 to Step S110 (Step S111).

Furthermore, the response generating apparatus 10 does not need to always perform all of the processes at Step S107 to Step S110. For example, the response generating apparatus 10 may also perform only the process of deleting overlapping information, and then, proceeds to the process at Step S111.

Furthermore, when the response generating apparatus 10 has already accepted the input information related to asking again at Step S102 (Yes Step S102), the response generating apparatus 10 specifies the element related to asking again from among the elements that are internally held (Step S112). Then, the response generating apparatus 10 generates a response related to asking again based on the specified element (Step S113).

The response generating apparatus 10 that has output the generated response to the user determines whether the dialogue process performed with the user has been ended (Step S114). Specifically, the response generating apparatus 10 determines whether a single session related to the dialogue with the user has been ended.

If the dialogue process is not ended (No at Step S114), the response generating apparatus 10 returns the process to Step S101 and continues the dialogue process. In contrast, if it is determined that the dialogue process has been ended (Yes at Step S114), the response generating apparatus 10 ends the process.

1-5. Modification According to the First Embodiment

Various modifications are possible for the response generating process according to the first embodiment described above. In the following, a modification of the first embodiment will be described.

The response generating apparatus 10 may also determine, based on the context information, such as a user attribute, whether the information is replaced. For example, in a case in which the user is a senior citizen or a child, in some cases, it is preferable that the response generated by the response generating apparatus 10 is expressed such that an intent is easy to understand even if the expression is redundant. In this case, the response generating apparatus 10 may refer to the user attribute, such as the age of the user, and does not need to perform the process of deleting or replacing the information included in the temporary response.

Furthermore, the response generating apparatus 10 may also perform a process of, in accordance with the user attribute, replacing the word (for example, a word having generally low frequency of appearance, etc.) that is supposed to be difficult to understand with a relatively simple word. Furthermore, the response generating apparatus 10 may also determine an output mode in accordance with the context information on the user such that, if a user is a child, priority is given to an image display over a speech.

Furthermore, the response generating apparatus 10 may also output pieces of information at constant intervals instead of not outputting the deleted information at all. For example, in FIG. 1, the description has been given of an example in which the response generating apparatus 10 gives only a speech of "It will be cloudy, then rain" out of "It will be cloudy, then rain in Yokohama today" that is included in the speech source information E01. At this time, the response generating apparatus 10 may also output the pieces of deleted information, such as "it is Yokohama" and "it is today", at constant period of time. In this case, the user may also stop the speech given by the response generating apparatus 10 by sending a sign of a response, such as "understood" in the middle of the speech given by the response generating apparatus 10. Consequently, the user can listen to more important information with priority, and furthermore, can check more detailed information.

Furthermore, the response generating apparatus 10 may also change the degree of omission in accordance with the situation of the user. For example, the response generating apparatus 10 acquires a moving speed of the user or a speaking speed of the user and compares the acquired data with the daily moving speed or the speaking speed. Then, if the moving speed or the speaking speed is faster than usual, the response generating apparatus 10 determines that the user is in a hurry situation. In this case, the response generating apparatus 10 may also perform a process of increasing an amount of information to be deleted so as to further shorten the response or perform a process of replacing a greater amount of information with an abstract expression. Consequently, the response generating apparatus 10 can generate an appropriate response conforming to the situation of the user.

2. Second Embodiment

2-1. Example of Information Processing According to the Second Embodiment

In the following, the second embodiment will be described. In the second embodiment, the response generating apparatus 10 performs a process of replacing a previously set qualitative expression with an appropriate expression conforming to the situation of the user.

Figure 18:
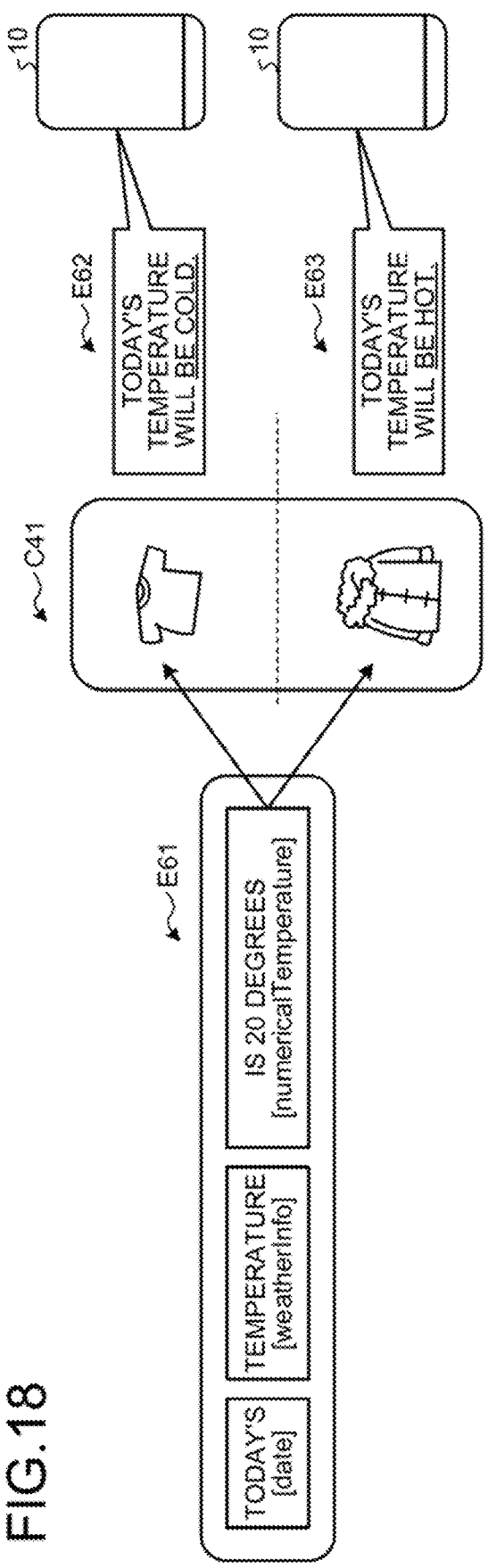
FIG. 18 is a diagram illustrating information processing according to a second embodiment of the present disclosure.

FIG. 18 is a diagram illustrating an example of information processing according to the second embodiment of the present disclosure. In the example illustrated in FIG. 18, the response generating apparatus 10 includes a database DB01 that stores therein information that is used to select an expression.

FIG. 18 illustrates an example in which the response generating apparatus 10 that captures, by a camera, the situation of the user who is about to go out generates speech source information E61 having the content of "today's (attribute: date)", "temperature is (attribute: whetherInfo)", and "20 degrees (attribute: numericalTemperature)".

At this time, the response generating apparatus 10 determines that a notification of a temperature (attribute: whetherInfo) is included in the speech source information E61 to be output to the user. In this case, the response generating apparatus 10 refers to the database DB01 and performs, if the response type is "notification of temperature", a process of replacing the speech source information E61 in accordance with the determination criteria of "user's clothes" or an "average temperature".

In the example illustrated in FIG. 18, it is assumed that the response generating apparatus 10 uses the determination criteria of "user's clothes". In this case, for the determination element, a season, a temperature, clothes, or a user attribute is used. As an example, FIG. 18 illustrates an example in which the response generating apparatus 10 replaces the speech source information E61 based on the temperature and the user's clothes. For example, in the database DB01, when the temperature is "20 degrees" and the user's clothes are "short sleeve clothes", it is assumed that a setting has been made such that the expression of the temperature is replaced with "It will be cold". Furthermore, in the database DB01, when the temperature is "20 degrees" and the user's clothes are a "winter coat" or the like, it is assumed that a setting has been made such that the expression of the temperature is replaced with "It will be hot". Furthermore, in the database DB01, when the temperature is "20 degrees" and the user's clothes do not correspond to the above described items, it is assumed that a setting has been made such that the expression of the temperature is replaced with a "suitable temperature".

In FIG. 18, the response generating apparatus 10 recognizes an image of the user and acquires information C41 as the context information. In the information C41, if it is determined that the user wears "short sleeve" clothes, the response generating apparatus 10 replaces the expression of the temperature included in the speech source information E61 with "It will be cold" in accordance with the setting made in the database DB01. Namely, the response generating apparatus 10 generates a response E62 including the content indicating that "The temperature today will be cold".

Furthermore, in information C41, it is determined that the user wears "winter coat" clothes, the response generating apparatus 10 replaces the expression of temperature included in the speech source information E61 with "It will be hot" in accordance with the setting made in the database DB01. Namely, the response generating apparatus 10 generates a response E63 including the content indicating that "The temperature today will be hot".

Furthermore, the response generating apparatus 10 may also replace the expression in accordance with, for example, a difference with the most recent average temperature instead of the user's clothes. For example, when a difference between the most recent weekly average temperature and the temperature included in the speech source information E61 is greater than or equal to "+3 degrees", the response generating apparatus 10 replaces the expression of the temperature with "It will be hot". Furthermore, when a difference between the most recent weekly average temperature and the temperature included in the speech source information E61 is greater than or equal to "−3 degrees", the response generating apparatus 10 replaces the expression of the temperature with "It will be cold".

As described above, the response generating apparatus 10 converts, in accordance with the context information on the user, the quantitative numerical value information (for example, a temperature, etc.) included in the speech source information to the expression that is easy to understand intuitively and in which the level of abstraction is high. Consequently, in addition to the information as a simple numerical value, the user can sensually understand what kind of meaning is included in the information indicated by the numerical value in the own situation. In this way, because the response generating apparatus 10 can not only simply exhibit the numerical value information to the user but also exhibit an appropriate expression conforming to the situation of the user, it is possible to implement an effective dialogue with the user.

2-2. Modification of the Second Embodiment

The example illustrated in FIG. 18 indicates that the response generating apparatus 10 replaces the numerical value information, such as a temperature, based on the setting held by the database DB01. In contrast, the response generating apparatus 10 according to the modification may also perform a process of replacing the numerical value information or the like by using a learning result related to the replacement instead of the database DB01.

Figure 19:
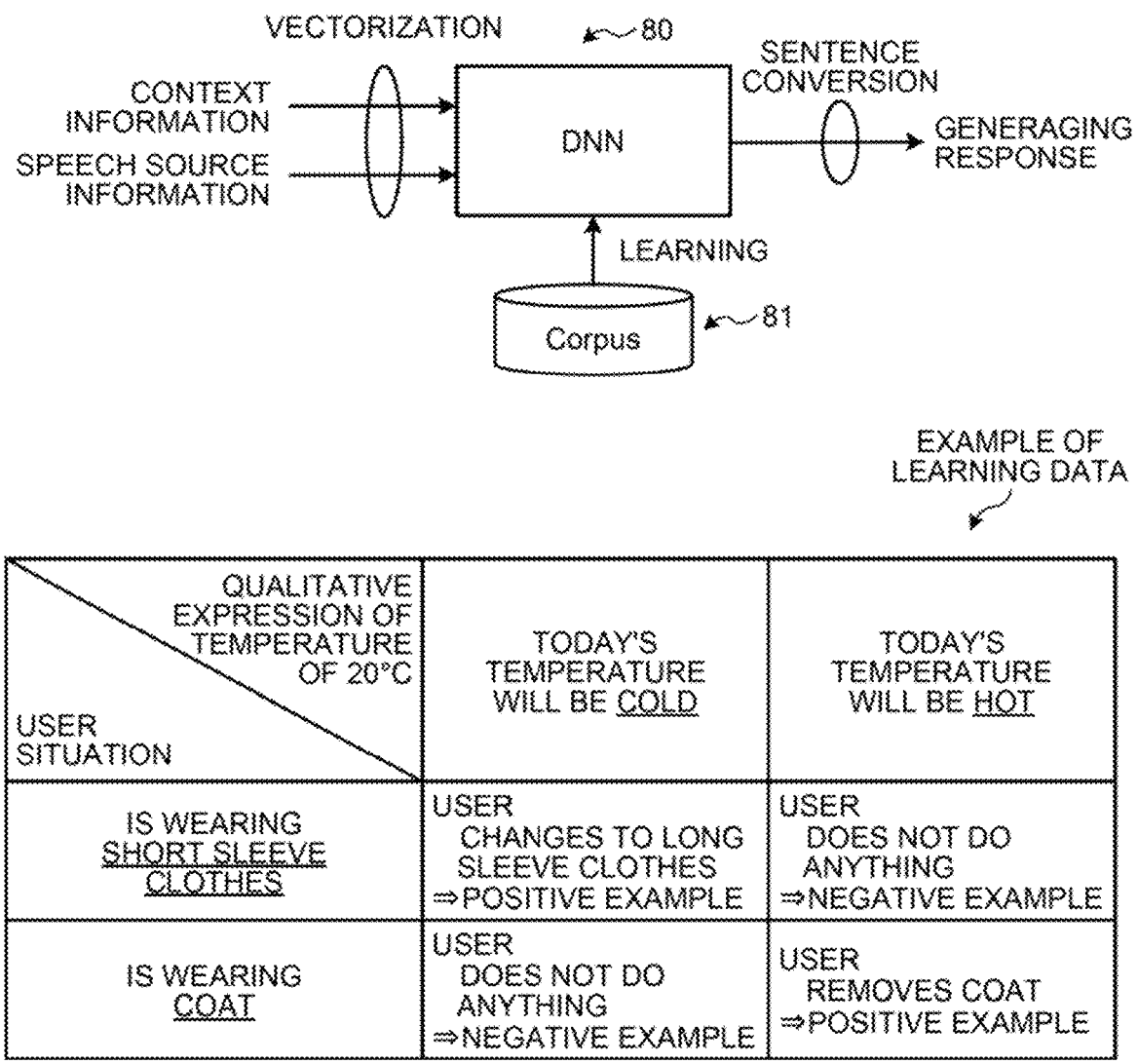
FIG. 19 is a diagram illustrating information processing according to a modification of the second embodiment of the present disclosure.

This point will be described with reference to FIG. 19. FIG. 19 is a diagram illustrating an example of information processing according to the modification of the second embodiment of the present disclosure.

In the example illustrated in FIG. 19, the response generating apparatus 10 includes a model 80 that is a learning machine (model) constituted by deep neural networks (DNNs) having neurons in multiple stages. As illustrated in FIG. 19, the response generating apparatus 10 acquires, as an input to the model 80, speech source information and various kinds of context information. At this time, the response generating apparatus 10 vectorizes the words of the attributes or the like included in the speech source information or the context information so as to express by, for example, a one-hot vector. Then, the response generating apparatus 10 inputs the vectorized speech source information or the context information to the model 80. Furthermore, an output example of the model 80 is a character string of the generated response. Furthermore, the response generating apparatus 10 acquires an example of learning data from a corpus 81 in which the pieces of learning data are accumulated.

As illustrated in FIG. 19, an example of the learning data is to perform labelling, when the situation of the user "is wearing short sleeve clothes" is input and "the temperature today will be cold" is output as a response, if the user changed into long sleeve clothes later, the output thereof as a "positive example". This indicates that a setting is made, as a correct data, such that the situation in which the user "is wearing short sleeve clothes" at the temperature of 20 degrees indicates that the user is supposed to feel "cold".

Similarly, another example is to perform labelling, when the situation of the user "is wearing a short sleeve clothes" is input and "the temperature today will be hot" is output as a response, if the user does not do anything (remaining wearing the short sleeve clothes), the output thereof as a "negative example". Furthermore, another example is to perform labelling, when the situation of the user "is wearing a coat" is input and "the temperature today will be cold" is output as a response, if the user does not do anything (remaining wearing the coat), the output thereof as a "negative example". Furthermore, another example is to perform labelling, when the situation of the user "is wearing a coat" is input and "the temperature today will be hot" is output as a response, if the user removes the coat later, the output thereof as a "positive example".

A description will be given by using the example illustrated in FIG. 18. The response generating apparatus 10 acquires, as an input, the speech source information E61 that includes the content of "today's (attribute: date)", "the temperature is (attribute: whetherInfo)", and "is 20 degrees (attribute: numericalTemperature)" and the information C41 that indicates the context indicating that the user's clothes are "short sleeve clothes" or a "winter coat". Then, the response generating apparatus 10 acquires an output response ("it will be cold" or "it will be hot", etc.), an action of the user with respect to the response ("changed clothes" or "does not do anything", etc.), or the like, determines that the result as a positive example or a negative example, and collects learning data. Then, the response generating apparatus 10 learns the model 80 by using the learning data constituted of the acquired positive examples and negative examples. After the completion of the learning of the model 80, the response generating apparatus 10 can input information to the model 80 and obtains an appropriate output.

In this way, the response generating apparatus 10 may also acquire a reaction with respect to the generated response from the user and learn, by using the reaction acquired from the user as the positive example or the negative example, a method for deciding an abstract expression by replacing a specific numerical value or time included in a temporary response. Consequently, the response generating apparatus 10 can select an appropriate quantitative expression conforming to the context information on the user without referring to the database DB01.

Furthermore, the learning process illustrated in FIG. 19 is an example and the response generating apparatus 10 may also use any learning technique that uses a model as long as the model that is capable of obtaining the context information and the speech source information as an input and a response of selected expression as an output.

3. Another Embodiment

The processes according to ach of the embodiments described above may also be performed with various kinds of embodiments other than the embodiments described above.

In each of the embodiments described above, an example in which the response generating apparatus 10 is the so-called smart speaker and performs the process in a stand-alone manner has been described. However, the response generating apparatus 10 may also perform the response generating process according to the present disclosure in cooperation with a server device (the so-called cloud server, etc.) connected by a network.

In this case, the response generating apparatus 10 acquires voices or the context information that are input to the terminal, such as a smart speaker; generates a response based on the acquired information; and sends the generated response to the terminal. In this case, the terminal, such as the smart speaker, functions as an interface that mainly performs a dialogue process with the user including a process of collecting speeches given by the user, a process of sending the collected speeches to the server device, and a process of outputting a reply sent from the server device.

Furthermore, the response generating apparatus according to the present disclosure mentioned above may also be implemented by in the form of an IC chip or the like installed in the response generating apparatus 10.

Furthermore, of the processes described above in each of the embodiment, the whole or a part of the processes that are mentioned as being automatically performed can also be manually performed, or the whole or a part of the processes that are mentioned as being manually performed can also be automatically performed using known methods. Furthermore, the flow of the processes, the specific names, and the information containing various kinds of data or parameters indicated in the above specification and drawings can be arbitrarily changed unless otherwise stated. For example, various kinds of information illustrated in each of the drawings is not limited to the information illustrated in the drawings.

Furthermore, the components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions. For example, the meaning understanding unit 51 and the dialogue control unit 52 may also be integrated.

Furthermore, each of the embodiments and the modifications described above can be used in any appropriate combination as long as the processes do not conflict with each other.

Furthermore, the effects described in this specification is only exemplified and is not limited, and other effects may also be possible.

4. Effect of the Response Generating Apparatus According to the Present Disclosure As described above, the response generating apparatus according to the present disclosure (the response generating apparatus 10 in the embodiment) includes an acquiring unit (the acquiring unit 40 in the embodiment) and a response generating unit (the response generating unit 50 in the embodiment). The acquiring unit acquires input information that is a trigger for generating a response with respect to the user and the context information that is the information indicating the situation of the user. The response generating unit generates a response associated with the input information based on the context information acquired from the user.

Consequently, because the response generating apparatus according to the present disclosure can generate a flexible response conforming to the context of the user, the response generating apparatus can more efficiently provide agent functions, such as dialogues, to the user.

Furthermore, the acquiring unit acquires, as the input information, voice information sent out from the user. Consequently, the response generating apparatus according to the present disclosure can conduct an appropriate dialogue conforming to the situation of the user in communication with the user via voices.

Furthermore, the acquiring unit acquires, as the input information, detection information obtained by detecting an action performed by the user. Consequently, the response generating apparatus according to the present disclosure can generate an appropriate response conforming to the action performed by the user without the user giving a speech.

Furthermore, the acquiring unit acquires, as the context information, schedule information that is previously registered by the user. Consequently, because the response generating apparatus according to the present disclosure can use the schedule information as shared knowledge in order to generate the response, the response generating apparatus can generate the response associated with the detailed user situation.

Furthermore, the acquiring unit acquires, as the context information, action prediction information that is information estimated from an action performed by the user and that is information indicating future action prediction of the user. Consequently, the response generating apparatus according to the present disclosure can generate the response conforming to the action that is going to be performed by the user.

Furthermore, the acquiring unit acquires, as the context information, the attribute information that is related to the user and that is previously registered by the user. Consequently, the response generating apparatus according to the present disclosure can generate the response conforming to the feature of each of the user, such as an aged or a child user, or a user having a visual impairment.

Furthermore, the response generating unit generates the response associated with the input information by deleting an element that overlaps with the context information included in a temporary response that is a response temporarily generated in association with the input information and then. Consequently, because the response generating apparatus according to the present disclosure can delete redundant information, the response generating apparatus can generates a response including simple and, furthermore, necessary and sufficient information.

Furthermore, when the response generating unit accepts, from the user, a reaction that is related to the element deleted from the temporary response and that is with respect to the generated response, the response generating unit generates a second response associated with the reaction based on the deleted element. Consequently, when the user desires more detailed information, the response generating apparatus according to the present disclosure can exhibit desired information to the user while generating a simple response.

Furthermore, the response generating unit determines, in accordance with the number of times the reaction related to the element deleted from the temporary response has been accepted from the user, the element to be eliminated from the temporary response. Consequently, the response generating apparatus according to the present disclosure can generate the response optimized to each of the users.

Furthermore, the response generating unit generates the response associated with the input information by adding the element included in the context information to the temporary response that is a response temporarily generated in association with the input information. Consequently, because the response generating apparatus according to the present disclosure can exhibit the information that is not noticed by the user or the information that is not able for the user to acquire by himself to the user, the response generating apparatus can improve the usability related to the dialogue system.

Furthermore, the response generating unit calculates the degree of conformance between the element included in the context information and the user, decides the element to be added to the temporary response based on the calculated degree of conformance, and generates the response associated with the input information. Consequently, the response generating apparatus according to the present disclosure can generate the response after appropriately selecting the information to be exhibited to the user.

Furthermore, the response generating unit generates the response associated with the input information by changing the temporary response that is the response temporarily generated in association with the input information to different expression based on the context information. Consequently, the response generating apparatus according to the present disclosure can generate a response that is easy to understand for the user instead of a redundant expression or can generate an expression that is difficult for the user to understand.

Furthermore, the response generating unit generates the response associated with the input information by changing a specific numerical value or time included in the temporary response to an abstract expression. Consequently, the response generating apparatus according to the present disclosure can generate the response that is used to deliver simple and necessary information.

Furthermore, the acquiring unit acquires, as the context information, information indicating the situation of the user at the time in which the input information has been acquired. The response generating unit decides, based on the information indicating the situation of the user, the abstract expression replaced from the specific numerical value or time included in the temporary response. Consequently, the response generating apparatus according to the present disclosure can generate the response that uses an appropriate expression conforming to the situation of the user.

Furthermore, the acquiring unit acquires, from the user, a reaction with respect to the generated response. The response generating unit learns a technique for deciding an abstract expression replaced from the specific numerical value or time included in the temporary response by using the reaction acquired from the user as a positive example or a negative example. Consequently, the response generating apparatus according to the present disclosure can select an appropriate response without referring to the database in which expressions for replacements are stored.

5. Hardware Configuration

Figure 20:
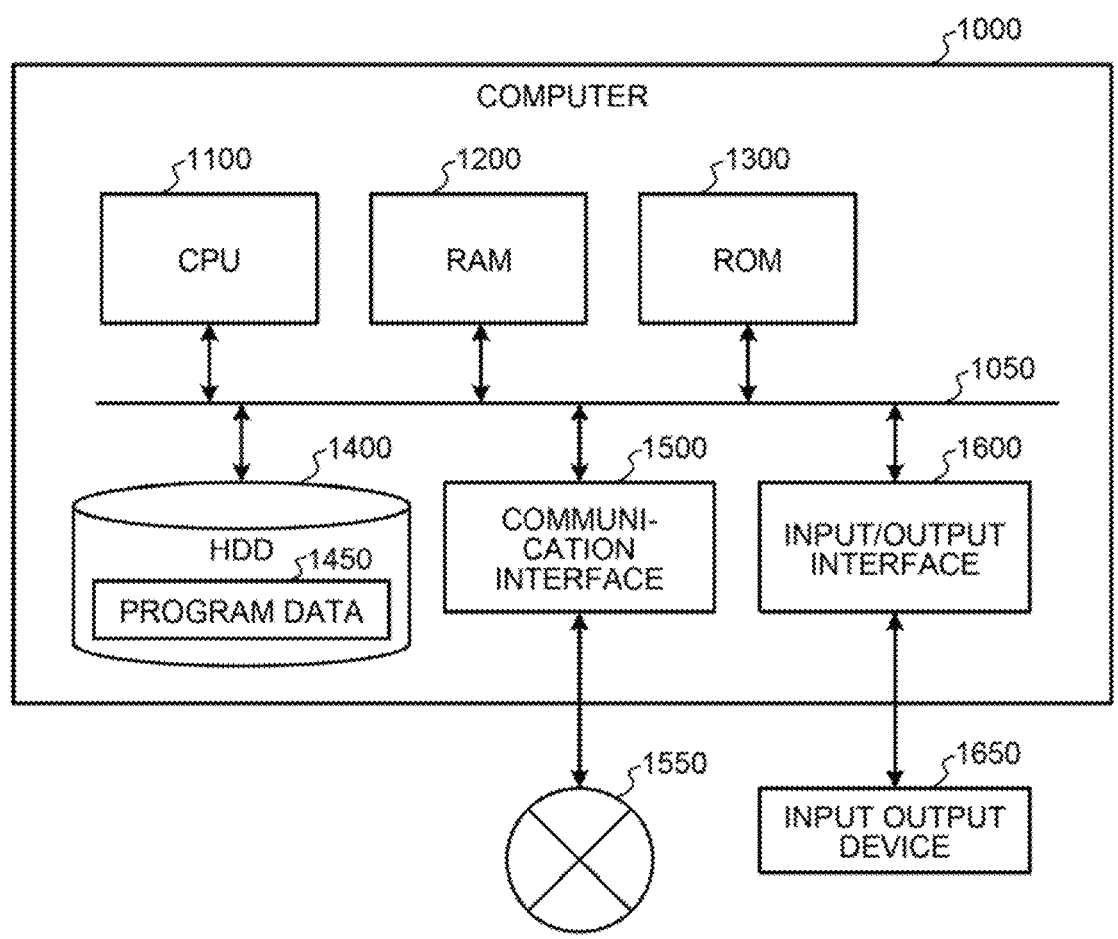
FIG. 20 is a hardware configuration diagram illustrating an example of a computer that implements a function of a response generating apparatus.

The information devices, such as the response generating apparatus 10 and the external server 200 according to each of the embodiments described above can be implemented by, for example, a computer 1000 having a configuration illustrated in FIG. 20. In the following, a description will be given by using the response generating apparatus 10 according to the first embodiment as an example. FIG. 20 is a diagram illustrating the hardware configuration of the computer 1000 that implements the function of the response generating apparatus 10. The computer 1000 includes a CPU 1100, a RAM 1200, a read only memory (ROM) 1300, a hard disk drive (HDD) 1400, a communication interface 1500, and an input/output interface 1600. Each of the units in the computer 1000 is connected by a bus 1050.

The CPU 1100 operates based on the programs stored in the ROM 1300 or the HDD 1400 and controls each of the units. For example, the CPU 1100 loads the programs stored in the ROM 1300 or the HDD 1400 into the RAM 1200 and executes the processes associated with various programs.

The ROM 1300 stores therein a boot program of a Basic Input Output System (BIOS) or the like that is executed by the CPU 1100 at the time of starting up the computer 1000 or a program or the like that depends on the hardware of the computer 1000.

The HDD 1400 is a computer readable recording medium that records therein, in a non-transitory manner, the programs executed by the CPU 1100, data that is used by these programs, and the like. Specifically, the HDD 1400 is a medium that records therein a response generating program according to the present disclosure that is an example of program data 1450.

The communication interface 1500 is an interface for connecting to an external network 1550 (for example, the Internet) by the computer 1000. For example, the CPU 1100 receives data from another device via the communication interface 1500 and sends data generated by the CPU 1100 to the other device.

The input/output interface 1600 is an interface for connecting an input/output device 1650 and the computer 1000. For example, the CPU 1100 receives data from an input device, such as a keyboard or a mouse, via the input/output interface 1600. Furthermore, the CPU 1100 sends data to an output device, such as a display, a speaker, a printer, via the input/output interface 1600. Furthermore, the input/output interface 1600 may also function as a media interface that reads programs or the like recorded in a predetermined recording medium (media). An example of one of the media mentioned here includes an optical recording medium, such as a digital versatile disc (DVD) and a phase change rewritable disk (PD), a magneto-optical recording medium, such as magneto-optical disk (MO), a tape medium, a magnetic recording medium, a semiconductor memory, or the like.

For example, when the computer 1000 functions as the response generating apparatus 10 according to the first embodiment, the CPU 1100 in the computer 1000 implements the function of the acquiring unit 40 by executing the response generating program loaded onto the RAM 1200. Furthermore, the HDD 1400 stores therein the response generating program according to the present disclosure and the data included in the storage unit 30. Furthermore, the CPU 1100 reads the program data 1450 from the HDD 1400 and executes the programs; however, as another example, the CPU 1100 may also acquire these programs from the other device via the external network 1550.

Furthermore, the present technology can also be configured as follows.

(1)
A response generating apparatus comprising:
an acquiring unit that acquires input information that is a trigger for generating a response with respect to a user and context information that is information indicating a situation of the user; and
a response generating unit that generates a response associated with the input information based on the context information acquired from the user.

(2)
The response generating apparatus according to (1), wherein the acquiring unit acquires, as the input information, voice information sent out by the user.

(3)
The response generating apparatus according to (1) or (2), wherein the acquiring unit acquires, as the input information, detection information obtained by detecting an action performed by the user.

(4)
The response generating apparatus according to any one of (1) to (3), wherein the acquiring unit acquires, as the context information, schedule information that is previously registered by the user.

(5)
The response generating apparatus according to any one of (1) to (4), wherein the acquiring unit acquires, as the context information, action prediction information that is information estimated from an action performed by the user and that is information indicating future action prediction of the user.

(6)
The response generating apparatus according to any one of (1) to (5), wherein the acquiring unit acquires, as the context information, attribute information that is related to the user and that is previously registered by the user.

(7)
The response generating apparatus according to any one of (1) to (6), wherein the response generating unit generates the response associated with the input information by deleting an element that overlaps with the context information included in a temporary response that is a response temporarily generated in association with the input information.

(8)
The response generating apparatus according to (7), wherein, when the response generating unit accepts, from the user, a reaction that is related to the element deleted from the temporary response and that is with respect to the generated response, the response generating unit generates a second response associated with the reaction based on the deleted element.

(9)
The response generating apparatus according to (8), wherein the response generating unit determines, in accordance with the number of times the reaction related to the element deleted from the temporary response has been accepted from the user, the element to be deleted from the temporary response.

(10)
The response generating apparatus according to any one of (1) to (9), wherein the response generating unit generates the response associated with the input information by adding an element included in the context information to a temporary response that is a response temporarily generated in association with the input information.

(11)
The response generating apparatus according to (10), wherein the response generating unit
calculates the degree of conformance between the element included in the context information and the user,
decides the element to be added to the temporary response based on the calculated degree of conformance, and
generates the response associated with the input information.

(12)
The response generating apparatus according to any one of (1) to (11), wherein the response generating unit generates the response associated with the input information by changing a temporary response that is a response temporarily generated in association with the input information to a different expression based on the context information.

(13)
The response generating apparatus according to (12), wherein the response generating unit generates the response associated with the input information by changing a specific numerical value or time included in the temporary response to an abstract expression.

(14)
The response generating apparatus according to (13), wherein
the acquiring unit acquires, as the context information, information indicating the situation of the user at the time in which the input information is acquired, and
the response generating unit decides, based on the information indicating the situation of the user, the abstract expression to be replaced from the specific numerical value or time included in the temporary response.

(15)

The response generating apparatus according to (14), wherein the acquiring unit acquires, from the user, a reaction with respect to the generated response, and the response generating unit learns a technique for deciding an abstract expression replaced from the specific numerical value or time included in the temporary response by using the reaction acquired from the user as a positive example or a negative example.

(16)

A response generating method that causes a computer to execute a process comprising:

acquiring input information that is a trigger for generating a response with respect to a user and context information that is information indicating a situation of the user; and generating, based on the context information acquired from the user, a response associated with the input information.

(17)

A response generating program that causes a computer to function as:

an acquiring unit that acquires input information that is a trigger for generating a response with respect to a user and context information that is information indicating a situation of the user; and a response generating unit that generates, based on the context information acquired from the user, a response associated with the input information.

REFERENCE SIGNS LIST 1 response generating system
10 response generating apparatus
20 sensor
21 input unit
22 communication unit
30 storage unit
31 user information table
32 shared knowledge table
33 response rule table
34 grant rule table
40 acquiring unit
41 detecting unit
42 registering unit
43 receiving unit
50 response generating unit
51 meaning understanding unit
52 dialogue control unit
53 generating unit
54 output control unit
60 output unit
200 external server

The invention claimed is:

1. A response generating apparatus comprising:

acquiring circuitry configured to acquire input information that is a trigger for generating a response with respect to a user and context information indicating a situation of the user; and response generating circuitry configured to generate the response associated with the input information based on the context information acquired by the acquiring circuitry, wherein the acquiring circuitry is further configured to acquire, as the context information action prediction information estimated from an action performed by the user and indicating a predicted future action of the user.

2. The response generating apparatus according to claim 1, wherein the acquiring circuitry is further configured to acquire, as the input information, voice information sent out by the user.

3. The response generating apparatus according to claim 1, wherein the acquiring circuitry is further configured to acquire, as the input information, detection information obtained by detecting an action performed by the user.

4. The response generating apparatus according to claim 1, wherein the acquiring circuitry is further configured to acquire, as the context information, schedule information that is previously registered by the user.

5. The response generating apparatus according to claim 1, wherein the acquiring circuitry is further configured to acquire, as the context information, attribute information that is related to the user and that is previously registered by the user.

6. The response generating apparatus according to claim 1, wherein the response generating circuitry is further configured to generate the response associated with the input information by deleting an element that overlaps with the context information from a temporary response temporarily generated in association with the input information.

7. The response generating apparatus according to claim 6, wherein, when the response generating circuitry receives, from the user, a reaction regarding the response that reaction is related to the element deleted from the temporary response, the response generating circuitry is further configured to generate a second response associated with the reaction based on the element deleted.

8. The response generating apparatus according to claim 7, wherein the response generating circuitry is further configured to determine, in accordance with the number of times the reaction related to the element deleted from the temporary response has been received from the user, the element to be deleted from the temporary response.

9. The response generating apparatus according to claim 1, wherein the response generating circuitry is further configured to generate the response associated with the input information by adding an element included in the context information to a temporary response temporarily generated in association with the input information.

10. The response generating apparatus according to claim 9, wherein the response generating circuitry is further configured to calculate a degree of conformance between the element included in the context information and the user, determine the element to be added to the temporary response based on the degree of conformance, and generate the response associated with the input information.

11. The response generating apparatus according to claim 1, wherein the response generating circuitry is further configured to generate the response associated with the input information by changing a temporary response temporarily generated in association with the input information, to a different expression based on the context information.

12. The response generating apparatus according to claim 11, wherein
the response generating circuitry is further configured to generate the response associated with the input information by changing a specific numerical value or time included in the temporary response to an abstract expression.

13. The response generating apparatus according to claim 12, wherein
the acquiring circuitry is further configured to acquire, as the context information, information indicating the situation of the user at the time in which the input information is acquired, and
the response generating circuitry is further configured to determine, based on the information indicating the situation of the user, the abstract expression to replace the specific numerical value or time included in the temporary response.

14. The response generating apparatus according to claim 13, wherein
the acquiring circuitry is further configured to acquire, from the user, a reaction with respect to the generated response, and
the response generating circuitry is further configured to learn a technique for determining the abstract expression to replace the specific numerical value or time included in the temporary response by using the reaction acquired from the user as a positive example or a negative example.

15. A response generating method that causes a computer to execute a process comprising:
acquiring input information that is a trigger for generating a response with respect to a user and context information indicating a situation of the user; and
generating, based on the context information the response associated with the input information, by providing a temporary response temporarily generated in association with the input information and by changing a specific numerical value or time included in the temporary response to an abstract expression.

16. A response generating program stored on a non-transitory computer-readable medium that causes a computer to function as:
acquiring circuitry configured to acquire input information that is a trigger for generating a response with respect to a user and context information indicating a situation of the user; and
response generating circuitry configured to generate, based on the context information acquired by the acquiring circuitry, the response associated with the input information, wherein
the response generating circuitry is further configured to generate the response associated with the input information by deleting an element that overlaps with the context information from a temporary response temporarily generated in association with the input information.

* * * * *